United States Patent

Ohishi et al.

[11] Patent Number: 5,506,830
[45] Date of Patent: Apr. 9, 1996

[54] DISK PLAYER

[75] Inventors: Seiichiroh Ohishi, Chiba; Akio Yamakawa, Kanagawa; Takashi Seki, Kanagawa; Tetsuhiro Shiomi, Kanagawa, all of Japan

[73] Assignee: Sony Corporation, Japan

[21] Appl. No.: 106,129

[22] Filed: Aug. 12, 1993

[30] Foreign Application Priority Data

| Aug. 14, 1992 | [JP] | Japan | 4-216851 |
| Aug. 14, 1992 | [JP] | Japan | 4-216852 |
| Aug. 17, 1992 | [JP] | Japan | 4-217746 |
| Aug. 17, 1992 | [JP] | Japan | 4-217747 |
| Mar. 31, 1993 | [JP] | Japan | 5-074396 |
| Mar. 31, 1993 | [JP] | Japan | 5-074401 |

[51] Int. Cl.[6] .......................... G11B 21/02; G11B 17/30
[52] U.S. Cl. .......................... 369/249; 369/195; 369/219
[58] Field of Search .................. 369/75.2, 77.1, 369/77.2, 195, 196, 199, 215, 219, 244, 249, 270, 271

[56] References Cited

U.S. PATENT DOCUMENTS

| 4,953,154 | 8/1990 | Takahara et al. | 369/195 |
| 5,025,440 | 6/1991 | Funabashi et al. | 369/199 |
| 5,097,465 | 3/1992 | Funabashi et al. | 369/199 |
| 5,172,370 | 12/1992 | Suzuki | 369/258 |
| 5,214,634 | 5/1993 | Maeoka et al. | 369/195 |

FOREIGN PATENT DOCUMENTS

| 0292942A1 | 11/1988 | European Pat. Off. . | |
| 0474987A2 | 3/1992 | European Pat. Off. . | |
| 60-70547 | 4/1985 | Japan | 369/77.1 |
| 1-113981 | 5/1989 | Japan | 369/270 |
| 2-260278 | 10/1990 | Japan | 369/270 |
| 4181521 | 6/1992 | Japan | 369/199 |

OTHER PUBLICATIONS

Patent Abstracts of Japan, vol. 12, No. 178 (P-708), 26 May 1988 & JP-A-62 287 476 (Sanyo Electric Co.), 14 Dec. 1987.

*Primary Examiner*—John H. Wolff
*Assistant Examiner*—William J. Klimowicz
*Attorney, Agent, or Firm*—Limbach & Limbach

[57] ABSTRACT

A disk player has a guide member for guiding an optical pickup carrier along both sides of a double-sided disk. In order to prevent interference between the pickup carrier and the periphery of the disk during turning movement of the pickup carrier around the periphery of the disk from one of the upper and lower sides of the disk to the other side, the guide member is shaped like a horseshoe. The guide member includes upper and lower straight sections for guiding the pickup carrier, respectively, along the upper and lower sides of the disc, and an arched section extending vertically around the periphery of the disk and connecting the outer ends of the upper and lower straight sections. The upper and lower straight sections are not parallel to each other, but rather they are inclined in such a fanlike manner that the outer ends are wider apart.

14 Claims, 25 Drawing Sheets

FIG.9

| | OPERATING MODE | TILT POSITION, PICKUP POSITION | DRIVE MOTOR | OPERATED SWITCH |
|---|---|---|---|---|
| 1 | A SIDE PLAY |  | TILT TRANSFER SERVO MODE | NONE |
| 2 | TILT NEUTRAL |  | TILT | TILT NEUTRAL |
| 3 | PICKUP TRANSFER A→B SIDE |  | TRANSFER | NONE |
| 4 | ARRIVAL AT B SIDE IN-LIMIT |  | TRANSFER | B SIDE IN-LIMIT |
| 5 | B SIDE PLAY |  | TILT TRANSFER SERVO MODE | NONE |

FIG.29
(PRIOR ART)

| | OPERATING MODE | TILT POSITION, PICKUP POSITION | DRIVE MOTOR | OPERATED SWITCH |
|---|---|---|---|---|
| 1 | A SIDE PLAY | | TILT TRANSFER SERVO MODE | A SIDE |
| 2 | TILT DOWN | | TILT | TILT DOWN |
| 3 | OUTWARD TRANSFER A SIDE | | TRANSFER | OUTER CIRCUM-FERENCE |
| 4 | TILT UP | | TILT | TILT UP |
| 5 | INWARD TRANSFER B SIDE | | TRANSFER | B SIDE |
| 6 | ARRIVAL AT B SIDE IN-LIMIT | | TRANSFER | B SIDE IN-LIMIT |
| 7 | B SIDE PLAY | | TILT TRANSFER SERVO MODE | B SIDE | form and function.

DISK PLAYER

BACKGROUND OF THE INVENTION

The present invention relates to a disk player, and more specifically to a disk player having a pickup guide mechanism and/or a disk loading and chucking mechanism.

One conventional optical disk player, as shown in FIG. 27, includes a pickup 102 for reading information recorded in both of the upper and lower surfaces of an optical disk 101, a pickup carrier 103 for carrying the pickup 102, and a pair of left and right guide members 107 and 108 for guiding the pickup carrier 103. Each guide member 107 or 108 includes a straight lower guide section 104 for assisting the pickup 102 to move radially along the lower surface of the disk 101, a straight upper guide section 105 for assisting the pickup 102 to move radially along the upper side of the disk 102, and a semicircular intermediate guide section 106 connecting radial outer ends of the lower and upper guide sections 104 and 105. (U.S. Pat. Nos. 4,839,881 and 4,953,154 show disk players of this type.)

In this conventional disk player, the lower and upper guides sections 104 and 105 of each guide member 107 or 108 are parallel to each other. This parallel layout is disadvantageous in the following respects.

The disk 101 placed on a turntable tends to sag at the outer periphery, and to be warped downward (about 2°) by its weight. Therefore, the pickup 102 is liable to interfere with the sagging periphery of the disk 101 during movement along the arched intermediate guide sections 106 around the periphery of the disk from the lower guide sections 104 to the upper guide sections 105 or vice versa. It is possible to avoid this problem by increasing the vertical spacing between the lower and upper guide sections 104 and 105. This results in an increase in the vertical dimension of the disk player, however.

Another way for preventing interference between the pickup and the disk is to provide a tilt mechanism for tilting the guide members 107 and 108 up and down.

FIG. 28 shows a conventional drive control system 111 for such a tilt type disk player. This drive control system includes a tilt motor 112, a tilt motor driver circuit 113, a feed (or transfer) motor 114, a feed (or transfer) motor driver circuit 115, a CPU 116, a tilt up detecting switch 117, a tilt down detecting switch 118, a feed A side detecting switch 119, a feed A side innermost circumference detecting switch 120, a feed B side detecting switch 121, a feed B side innermost circumference (B side in limit) detecting switch 122, and a feed outer circumference detecting switch 123.

As illustrated in FIG. 29, after the completion of the A side play, the tilt motor 112 is operated to tilt down the pickup guide members 107 and 108.

When the tilt-down is finished, and the tilt down detecting switch 118 detects this completion of the tilt down, then the feed motor 114 operates and moves the pickup 102 from the inner circumference of the A side to the outer circumference. When the pickup 102 reaches the outermost circumferential position and this is detected by the feed outer circumference detecting switch 123, then the tilt motor 112 operates and tilts up the pickup guide members 107 and 108.

When the tilt up detecting switch 117 detects the completion of the tilt up, the feed motor 114 moves the pickup 102 from the outermost circumferential position to the B side.

When the feed B side detecting switch 121 detects the movement of the pickup 102 to the B side, the feed motor 114 causes the pickup 102 to move from the outer circumference to the inner circumference of the B side.

When the pickup 102 reaches the innermost circumferential position of the B side, and the feed B side innermost circumference detecting switch 122 detects this reaching, the pickup 102 is stopped and the pickup guide members 107 and 108 are tilted down.

Then, the B side play follows.

The conventional tilt type disk player encounters the following problems, however.

Many position detecting switches are required, such as the tilt up and tilt down detecting switches 117 and 118, the feed A side detecting switch 119, the feed A side innermost circumference detecting switch 120, the feed B side detecting switch 121, the feed B side innermost circumference detecting switch 122, and the feed outer circumference detecting switch 123. This makes the drive control system 111 complicated in construction, and increases the product cost by increasing the number of the required component parts.

It takes time to transfer from the A side play to the B side play or vice versa on account of detecting many positions by a large number of switches.

In the above-mentioned conventional disk player, moreover, there are provided, on both sides of the pickup 102, a pair of left and right pickup guide members 107 and 108, and both ends of the pickup 102 are supported by these left and right pickup guide members 107 and 108 to guide the pickup 102. Therefore, the conventional disk player further has the following problems.

The disk player having the left and right pickup guide members on both sides of the pickup is inadequate for downsizing. Furthermore, the left and right pickup guide members standing on both sides are obstructive to repairing, maintaining and checking of the pickup.

Because both ends of the pickup are supported by the left and right pickup guide members, installation and removal of the pickup to and from the pickup guide members are troublesome.

When a driving force (sliding force) is applied to the pickup, the pickup may be twisted between the left and right pickup guide members, so that the pickup cannot slide smoothly.

SUMMARY OF THE INVENTION

It is an object of the present invention to provide a disk player which can reliably prevent interference between a pickup and a disk.

It is another object of the present invention to provide a disk player which can decrease the number of position detecting switches, and make it possible to transfer between the A side play and the B side play in a shorter time.

It is another object of the present invention to reduce the size of a disk player, and to provide a disk player in which a pickup can move smoothly and accurately. It is another object of the present invention to provide a tilt type disk player which can tilt the path of a pickup reliably and accurately.

It is another object of the present invention to provide a disk player which can detect and control the loading and chucking conditions easily, accurately and reliably.

According to the present invention, a disk player comprises: a pickup carrier (or optical block) having an optical pickup for reading information recorded in a disk; a support member having a flat reference surface; and a guide member which is supported by said support member and which supports said pickup carrier and guides said pickup carrier along a predetermined path in a plane parallel to said reference surface of said support member. The guide member comprises a lower guide section for assisting said pickup carrier to move under said disk, an upper guide section for assisting said pickup carrier to move over said disk, and an arched intermediate guide section connecting outer ends of said lower and upper guide sections and assisting said pickup carrier to move from said lower guide section to said upper guide section and vice versa.

The disk player according to the present invention further has at least one of the following aspects.

The lower and upper guide sections of the guide member are oblique with respect to each other so that said lower and upper guide sections become gradually wider apart from each other toward said arched guide section.

The pickup carrier (or optical block) comprises a rear end confronting said reference surface of said support member and a front end which is more remote from said reference surface than said rear end of said pickup carrier, and said pickup carrier is supported only at said rear end of said pickup carrier, like a cantilever, by said guide member. The pickup carrier projects from said rear end away from said reference surface, and hangs free at said front end of said pickup carrier.

The disk player comprises a tilting means for joining said guide member with said support member, and for swinging said guide member about an imaginary pivot axis which is substantially perpendicular to said reference surface, so that said outer ends of said lower and upper guide sections move up and down. The tilting means may comprise a spring for pulling said guide member toward said reference surface of said support member, and further pulling said pickup carrier toward said vertical reference surface through said guide member. The tilting means may further comprises one or more pin joints each having a slider pin (or tilt pin) fixed to one of the support member and the guide member, and an elongate slot which is formed in the other and which is shaped in such a manner as to allow the guide member to swing about the pivot axis.

The disk player comprises a control gear member, a loading mechanism for loading and unloading the disk by receiving motion from said control gear member, a chucking mechanism having a disk chucking member for chucking the disk, and a chuck linkage for transmitting motion from said control gear member to said chucking member.

BRIEF DESCRIPTION OF THE DRAWINGS

FIG. 9 is an exploded perspective view of the pickup guide mechanism shown in FIG. 1.

FIG. 16 is a diagram illustrating operations of the control circuit shown in

FIG. 15.

FIGS. 24A to 24I are schematic views showing a process of loading and chucking operations of the mechanism shown in FIG. 19.

FIG. 29 is a diagram illustrating operations of the conventional control circuit of FIG. 28.

DETAILED DESCRIPTION OF THE INVENTION

Figure 1:
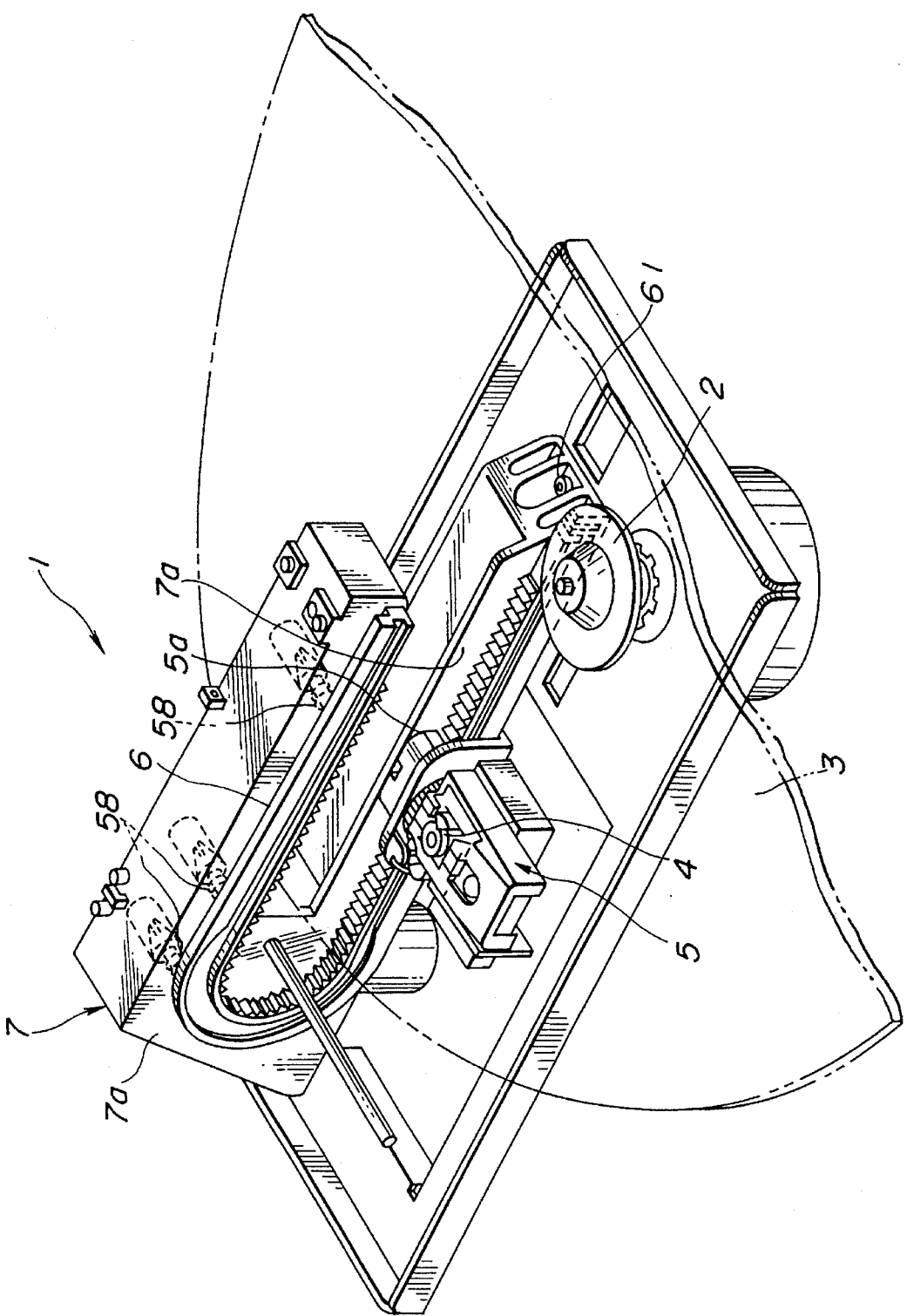
FIG. 1 is a perspective view showing a pickup guide mechanism according to one embodiment of the present invention.

FIGS. 1–4 show a pickup guide mechanism 1 of a disk player according to one embodiment of the present invention.

The pickup guide mechanism 1 of this disk player includes, at least, an optical pickup carrier block (which is simply referred to as an optical block or a pickup carrier) 5 having an optical pickup 4, an optical block guide member 6 and an optical block support member 7.

The pickup 4 is a device for reproducing information recorded on an optical disk 3 placed on a turntable 2 of the disk player 1. The guide member 6 guides the optical block 5 along the lower and upper surfaces (side A and side B) of the disk 3. The support member 7 has a vertically extending flat reference attachment surface 7a to which the guide member 6 is attached (swingably in this illustrated example as explained later). The optical block 5 has a vertical reference surface 5a which is flat and approximately perpendicular to the disk 3 placed on the turn table 2.

Figure 5:
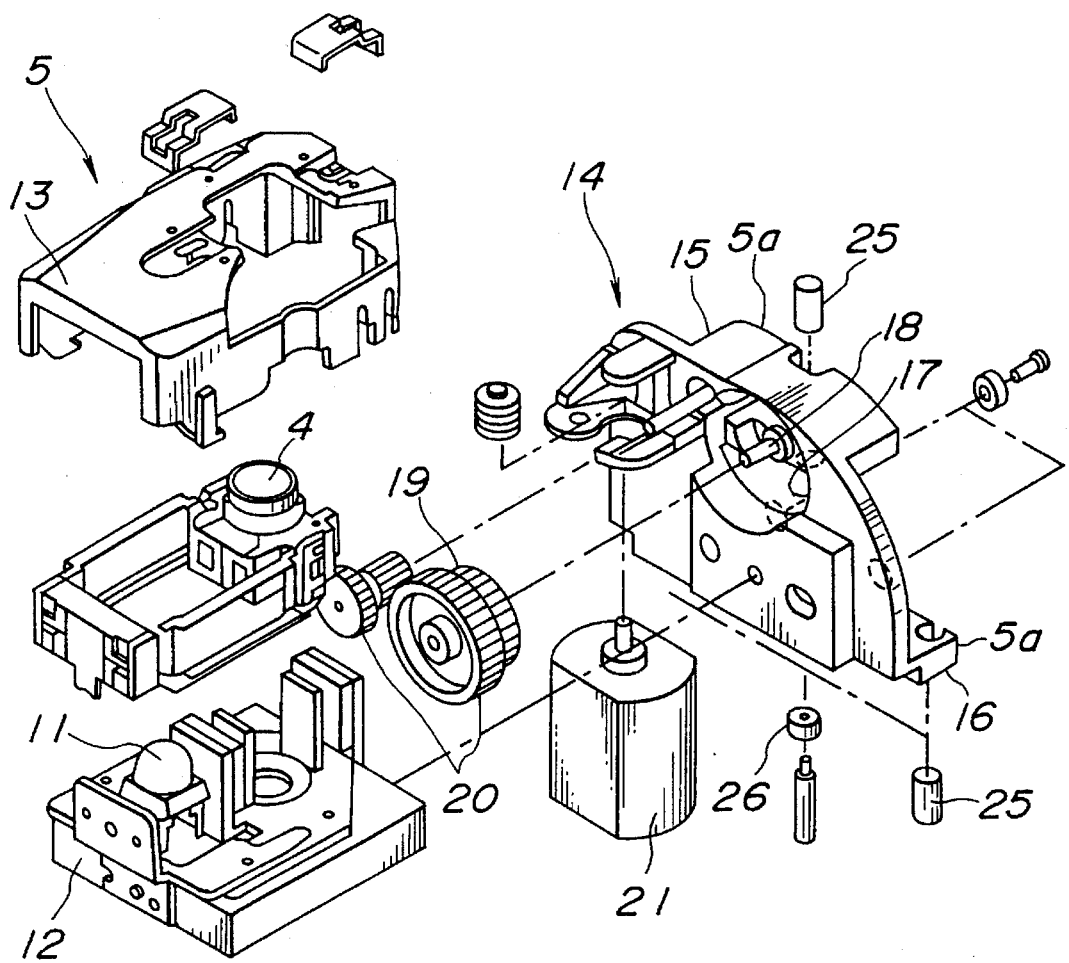
FIG. 5 is an exploded perspective view showing a pickup carrier of the pickup guide mechanism shown in FIG. 1.

The turntable 2 is arranged to support the disk 3 in a predetermined playing position as shown in FIG. 1, and to enable the disk 3 to rotate in the playing position on the turntable 2. In this playing position, the disk 2 can rotate in an imaginary disk rotation plane about an imaginary disk rotation axis which is coincident with the axis of the turntable 2 when the turntable 2 is placed in the position shown in FIG. 1. The vertical reference surface 7a of the support member 7 is substantially parallel to the disk rotation axis, and substantially perpendicular to the disk rotation plane. As shown in FIG. 5, the optical block (pickup carrier) 5 includes; a base plate 12 on which the pickup 4 and a tilt sensor 11 are mounted; a cover plate 13 which is placed over the base plate 12 and fixed to the base plate 12; and a (rear) side plate 14 which is fixed to a (rear) side of the base plate 12.

The side plate 14 has a main portion which is approximately in the form of a vertical plate, and has a front side and a rear side. The base plate 12 projects forwardly from the front side of the side plate 14. The side plate is formed with first (upper) and second (lower) projections 15 and 16 which both project rearwardly from the rear side of the side plate 14. The first (upper) projection 15 protrudes from a first (upper) end of the side plate 14, and the second (lower) projection 16 protrudes from a second (lower) end of the side plate 14. The first and second (upper and lower) projections 15 and 16 have flat end surfaces 5a which both face rearwardly and both extend in the same imaginary vertical reference plane. The optical block 5 is movable in such a manner that the vertical reference surfaces 5a of the optical block 5 are held in parallel to the vertical reference surface 7a of the support member 7. The optical block 5 can move along a plane curve in a plane parallel to the vertical reference surface 7a of the support member 7.

Figure 6:
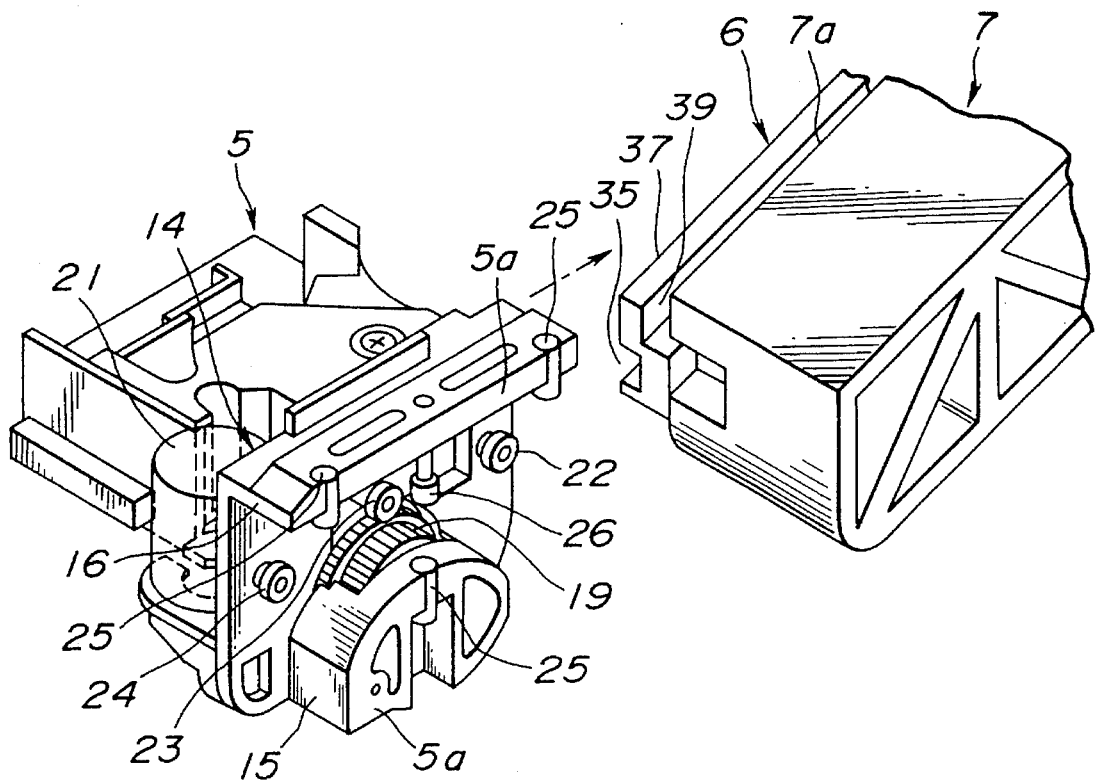
FIG. 6 is a perspective view of the pickup carrier of FIG. 5.

The side plate 14 has a pinion hole 17. The optical block 5 has a pinion shaft 18 located in the center of the pinion hole 17, as shown in FIG. 5. The pinion shaft 18 projects forwardly in a horizontal direction perpendicular to the vertical reference surfaces 5a. A pinion 19 is rotatably mounted on the pinion shaft 18. The pinion 19 is received in the pinion hole 17, and partly exposed on the rear side of the side plate 14 so that the pinion 19 can engage with a rack 34 of the guide member 6 on the rear side of the side plate 14. The exposed part of the pinion 19 is situated between the first and second projections 15 and 16, as shown in FIG. 6.

A gearing 20 connects the pinion 19 with a feed (or transfer) motor 21 for driving the optical block 5, and transmits rotation from the motor 21 to the pinion 19.

The optical block 5 has first, second and third normal guide rollers 22, 23 and 24, three parallel reference rollers 25 and a parallel holding roller 26. The axes of the three normal guide rollers 22, 23 and 24 are all substantially normal (or perpendicular) to the vertical reference surfaces 5a of the side plate 14. The axes of the parallel reference rollers 25 and the parallel holding roller 26 are all substantially parallel to the vertical reference surfaces 5a. These rollers are all mounted on the rear side of the side plate 14. The three normal guide rollers 22, 23 and 24 are received in a guide groove 35 of the guide member 6 so that the optical block 5 can move smoothly along the guide groove 35 of the guide member 6. The three reference rollers 25 are designed to abut on the vertical reference surface, and the holding roller 26 is designed to hold to the guide member 6. In this example, each of the rollers 22–26 has an outside cylindrical surface which is the cylindrical surface of a right circular cylinder, and each roller 22–24 and 26 is mounted so that each rolls or slides on a corresponding surface. The three reference rollers 25 of this example are fixed to the side plate 14. In this example, the reference rollers 25 are longer (in the axial length of the outside cylindrical surface) than any of the other rollers 22–24 and 26.

Figure 7:
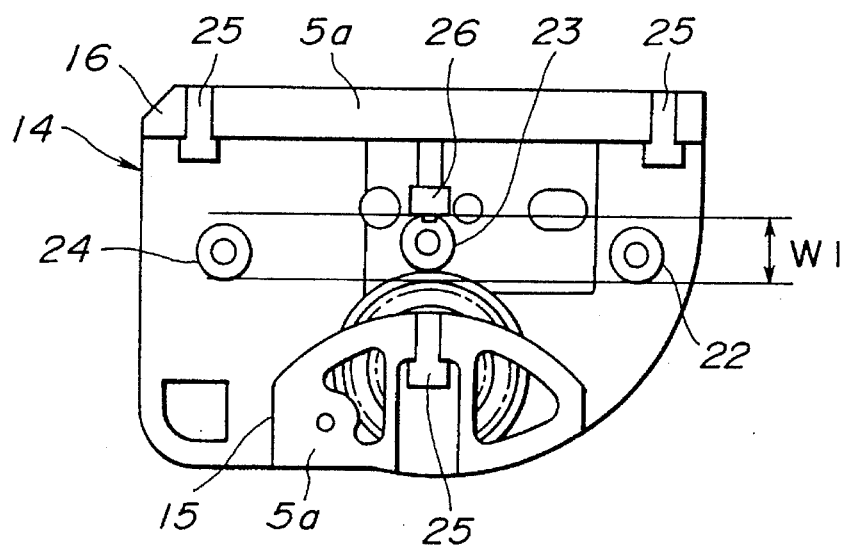
FIG. 7 is an elevation of the optical pickup carrier of FIG. 5.

In this illustrated example, the axes of the three normal guide rollers 22, 23 and 24 are parallel to one another, and the outside diameters of these cylindrical guide rollers 22, 23 and 24 are equal to one another. The second normal guide roller 23 is located between the first and third normal guide rollers 22 and 24. Each of the first and third guide rollers 22 and 24 is situated laterally at the side of the middle guide roller 23. The axis of the second (middle) normal guide roller 23 is spaced from an imaginary flat plane containing the axes of the first and third (outer) guide rollers 22 and 24. In FIG. 7, the width W1 is the distance between a first imaginary flat plane tangent to both the first and third (outer) rollers 22 and 24, and a second imaginary flat plane which is tangent to the second (middle) roller 23 and which is parallel to the first imaginary plane. The three guide rollers 22, 23 and 24 are confined between these two imaginary parallel planes which are parallel to the axes of the guide rollers 22, 23 and 24. In this way, the second guide roller 23 is positioned with an offset, relative to the first and third guide rollers 22 and 24. This offset arrangement of the guide rollers 22, 23 and 24 facilitates smooth movement along a U-shaped track as explained later. The distance between the axis of the middle roller 23, and an imaginary plane containing both of the axes of the outer rollers 22 and 24 can be said to be an offset distance.

Two of the three parallel reference rollers 25 are received in respective holes formed in the second (lower) projection 16, and partly exposed in the vertical reference surface 5a of the projection 16. The remaining one of the reference rollers 25 is received in a hole formed in the upper projection 15, and partly exposed in the vertical reference surface 5a of the projection 15. The shaft of the parallel holding roller 26 projects from the middle of the second (lower) projection 16 toward the first (upper) projection 15.

The guide member 6 of this embodiment includes a straight lower (first) guide section 31 extending from a central (radial inner) end to a peripheral (radial outer) end, a straight upper (second) guide section 32 extending from a central (radial inner) end to a peripheral (radial outer) end, and an arched (third) guide section 33 extending from the peripheral end of the lower portion 31 to the peripheral end of the upper portion 32. The guide member 6 as a whole is approximately in the form of a U which is laid down horizontally on its side. The lower guide section 31 extends under the optical disk 3 on the turn table 2 (under the imaginary disk rotation plane), and guides the optical block 5 along the downwardly facing lower recording surface of the optical disk 3. The upper guide portion 32 extends over the optical disk 3 (or the disk rotation plane) and guides the optical block 5 along the upwardly facing upper recording surface of the optical disk 3. The arched guide section 33 is shaped approximately like a semicircle, and guides the optical block 5 from the lower guide section 31 to the upper guide section 32 and vice versa. The optical block 5 can move continuously from the central end of the lower guide section 31 through the arched portion 33 to the central portion of the upper guide section 32. In the upper guide section 32, the optical block 5 is turned upside down, and the pickup 4 is aimed downwardly at the upwardly facing surface of the optical disk 3.

The straight lower and upper guide sections 31 and 32 are not parallel to each other, but inclined. The distance between the upper and lower guide sections 31 and 32 becomes gradually greater toward the arched guide section 33. The vertically extending interspace between the lower and upper guide sections 31 and 32 tapers toward the disk rotation axis. In this example, the inclination angle of each of the lower and upper guide sections 31 and 32 is equal to about 2°(in conformity with a maximum inclination of the outer peripheral portion of the disk 2).

The guide member 6 has a toothed inner peripheral portion 34 serving as a rack for engaging with the pinion 19 of the optical block 5, and a continuous guide groove 35 for receiving the three guide rollers 22, 23 and 24. The rack 34 and the guide groove 35 extend side by side to define the path along which the guide member 6 guides the optical block 5. The guide groove 35 is formed in the front side of the guide member 6. The guide groove 35 consists of lower and upper straight groove sections 36 and 37 and an arched groove section 38.

Figure 11:
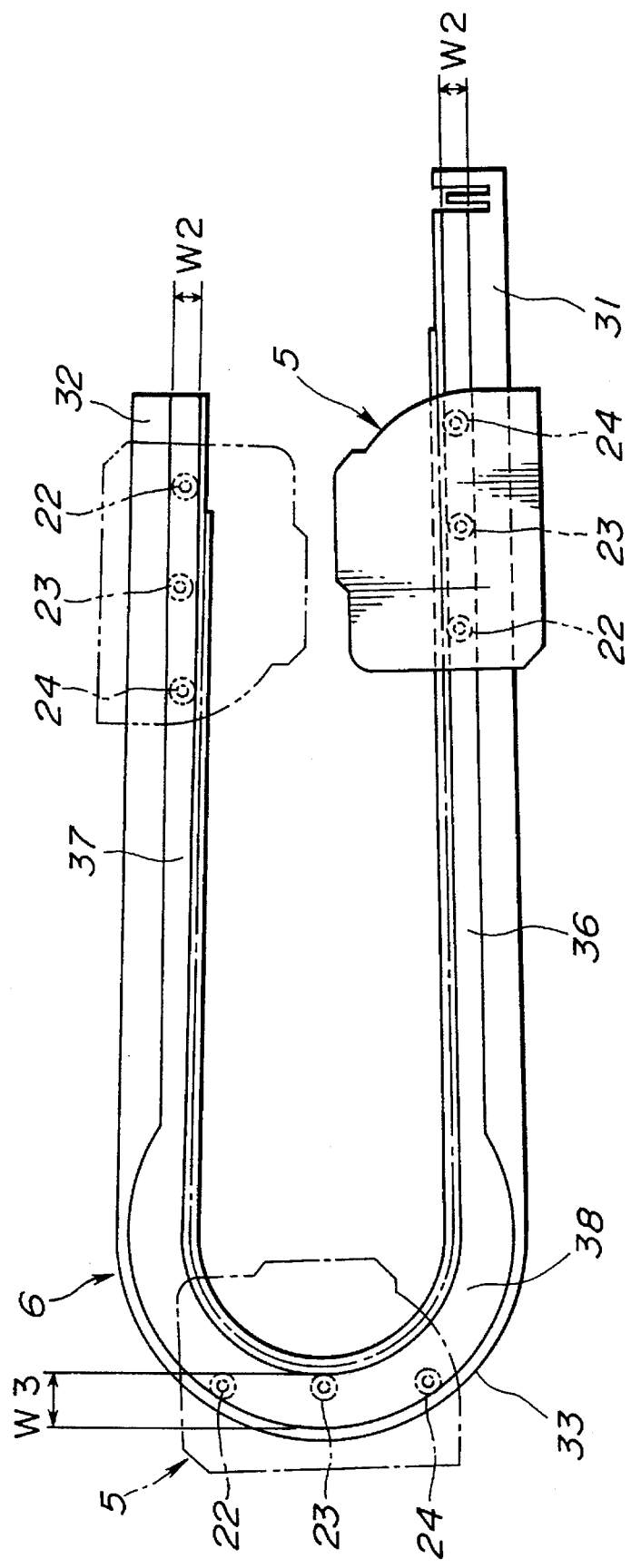
FIG. 11 is a front view of a guide member of the mechanism shown in FIG. 1.

Each of the upper and lower straight groove sections 36 and 37 extends rectilinearly, and is bounded between outer and inner side wall surfaces which are, in this example, flat and parallel to each other, as shown in FIG. 11. The widths (W2) of the lower and upper groove sections 36 and 37 are substantially equal to each other. The width w2 between the outer and inner side wall surfaces of each of the lower and upper straight groove sections 36 and 37 is substantially equal to the width WI of the arrangement of the guide rollers 22, 23 and 24 (shown in FIG. 7). The groove width W2 is greater than the outside diameter of the guide rollers 22, 23 and 24.

When the set of the three guide rollers 22, 23 and 24 is inserted in the upper or lower straight guide groove sections 36 or 37, the first and third guide rollers 22 and 24 abut on the inner side wall surface of the groove, and the second guide roller 23 abuts on the outer side wall surface. The guide rollers 22, 23 and 24 can snugly fit in each of the upper and lower straight grooves 36 and 37. This enables the optical block 5 to move smoothly without looseness and without rattling.

The lower and upper straight groove sections 36 and 37 are not parallel to each other, but they are inclined with respect to each other in such a manner that the separation between the lower and upper straight groove sections 36 and 37 becomes gradually smaller toward the central (radial inner) ends of the grooves 36 and 37, or toward the axis of the turn table 2. When the guide member 6 is in its neutral position, each of the lower and upper groove sections 36 and 37 is inclined like a mirror image of the other with respect to the imaginary horizontal disk rotation plane, and the inclination of each groove section 36 or 37 with respect to the horizontal disk rotation plane is approximately 2°. If the completely flat disk 3 is correctly placed in the playing position on the turntable 2, then the disk 3 can be divided into upper and lower equivalent slices by an imaginary symmetry plane which can be regarded as the imaginary disk rotation plane.

The arched groove section 38 extends curvilenearly like a circular arc or a semicircle, continuously from the peripheral (radial outer) end of the lower straight groove section 36 to the peripheral (radial outer) end of the upper straight groove section 37. Thus, the lower and upper straight groove sections 36 and 37 and the arched groove section 38 form a continuous U-shaped path along which the optical block 5 can move. The width W3 of the arched groove section 38 is greater than the width W2 of the lower and upper straight groove sections 36 and 37, as shown in FIG. 11, and greater than the width W1 of the guide roller set. Therefore, in the arched groove section 38, too, the set of the three guide rollers 22, 23 and 24 can move smoothly without looseness with the first and third rollers 22 and 24 rolling on one side wall, and the second roller 23 rolling on the other side wall of the arched groove section 38. The offset arrangement of the guide rollers 22, 23 and 24 makes it possible to carry the optical block 5 smoothly without looseness along the arched guide groove section 38 as well as along the straight guide groove sections 36 and 37.

Figure 9:
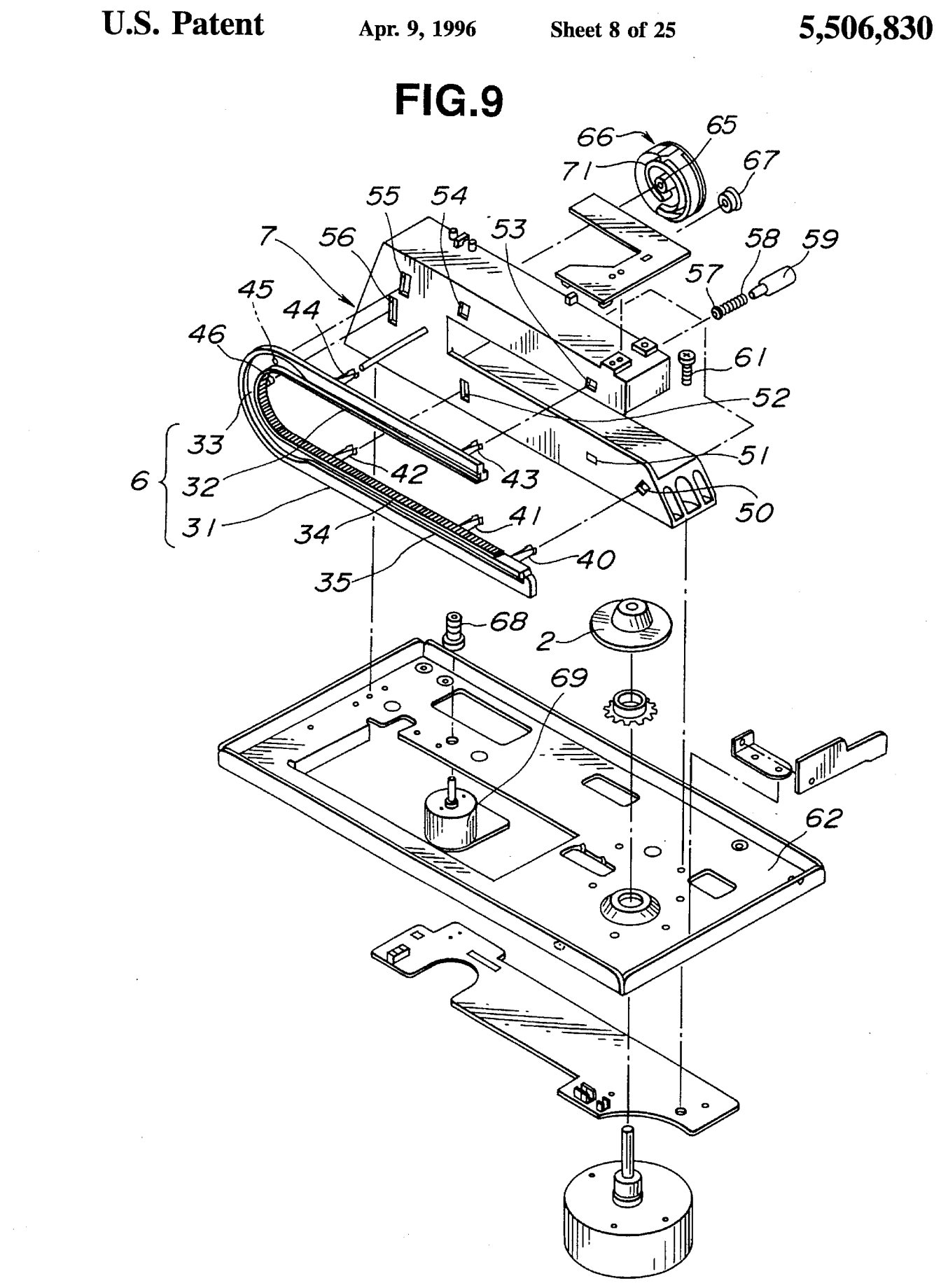

The guide member 6 has seven tilt pins 40~46 for joining the guide member 6 to the front reference surface 7a of the support member 7, as shown in FIG. 9. The tilt pins 40–46 project rearwardly from the rear side of the guide member 6. The first, second and third tilt pins 40, 41 and 42 are formed in the lower guide section 31. The fourth and fifth tilt pins 43 and 44 are formed in the upper guide section 32. The sixth and seventh tilt pins 45 and 46 are formed in the arched guide section 33.

Figure 10:
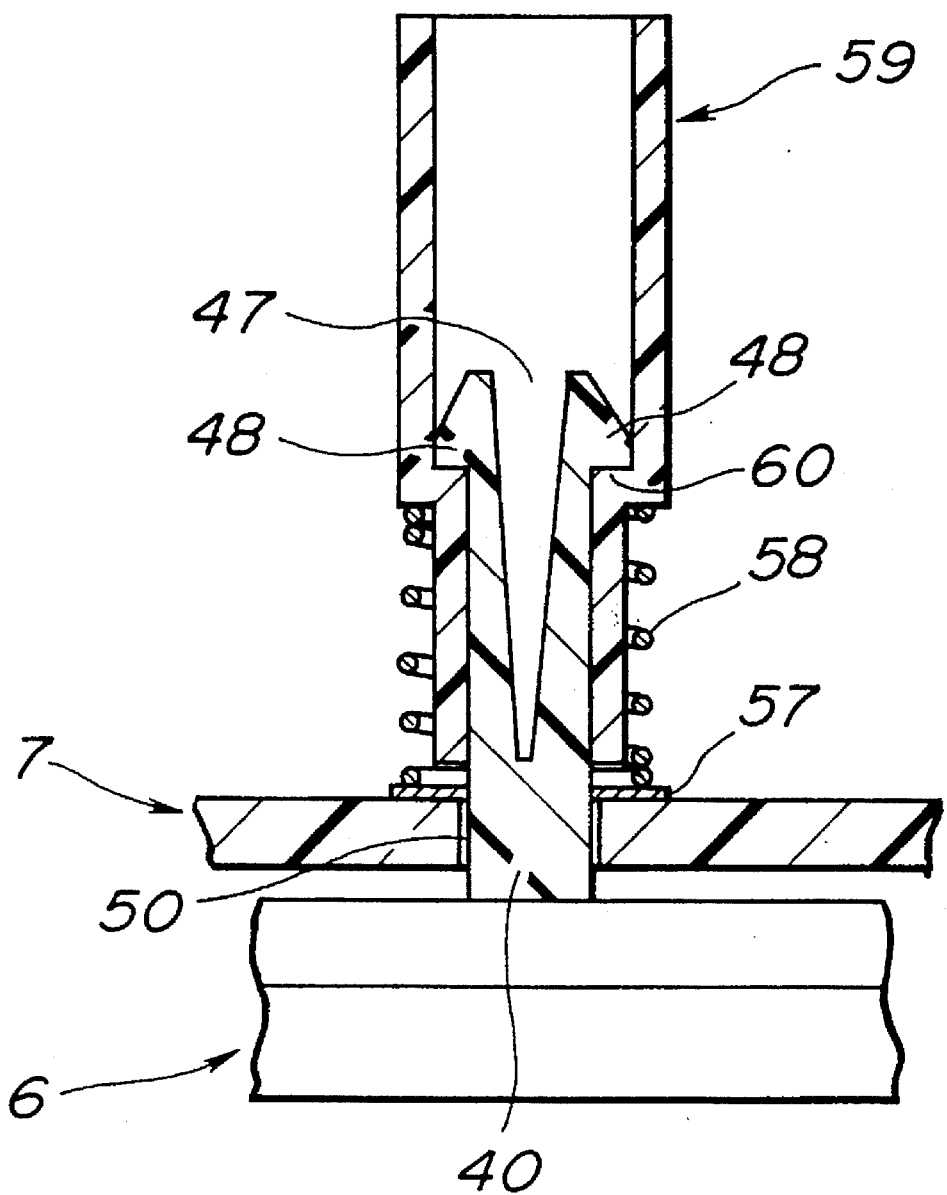
FIG. 10 is a sectional view of one tilt pin in an attached state, of the guide mechanism shown in FIG. 1.

Each of the first through sixth tilt pins 40~45 is in the form of a rod consisting of a solid base portion and a split rear portion which extends from the base portion to a projecting rear end, and which has a slit 47 and claws 48, as shown in FIG. 10. The slit 47 of the first tilt pin 40, for instance, extends longitudinally from the projecting rear end of the tilt pin 40 toward the base portion of the pin 40, and splits the rear portion of the tilt pin 40 into two halves. The claws 48 are outward projections formed in the outside periphery of the projecting end of the pin 40. The slit 47 makes it possible to elastically compress the halves of the projecting end of the pin 40 radially inwardly to a compressed state of a smaller diameter. The second through sixth tilt pins 41~45 are constructed in the same manner as the first pin 40.

The seven tilt pins 40~46 are inserted, respectively, in seven pin holes 50~56 which are formed in the front side vertical wall of the support member 7, and which are open in the vertical reference surface 7a defined by the front side vertical wall of the support member 7. After insertion of the tilt pins 40~46 into the respective pin holes 50~56, a washer 57, a coil spring 58 and a tubular spring retainer 59 are mounted, in order of mention, on each of the first through sixth split pins 40~45, as shown in FIG. 10. The tubular spring retainer 59 has a smaller portion having a smaller cross section, a larger portion having a larger cross section, and a step 60 formed between the smaller and larger portions. Each of the six split pins 40~45 is inserted in a smaller bore of the smaller portion of the spring retainer 59 until the projecting rear end of the split pin reaches a larger bore of the larger portion of the spring retainer 59, and the claws 48 expand radially outwardly and engage with the step 60 to prevent extraction of the pin. The smaller portion of the spring retainer 59 is inserted in the coil spring 58. The coil spring 58 is mounted on the smaller portion of the spring retainer 59 and compressed axially between the step 60 and the washer 57 abutting on the support member 7, as shown in FIG. 10.

As shown in FIG. 10, the (upwardly facing in FIG. 10,) rear surface of the guide member 6 is slightly spaced from the (downwardly facing in FIG. 10) front surface of the support member 7. This interspace between the guide member 6 and the support member 7 is formed, at and near the position of the optical block 5, by the rollers 25 abutting on the support member 7.

The optical block 5 is installed in the guide member 6 in the following manner.

Figure 8:
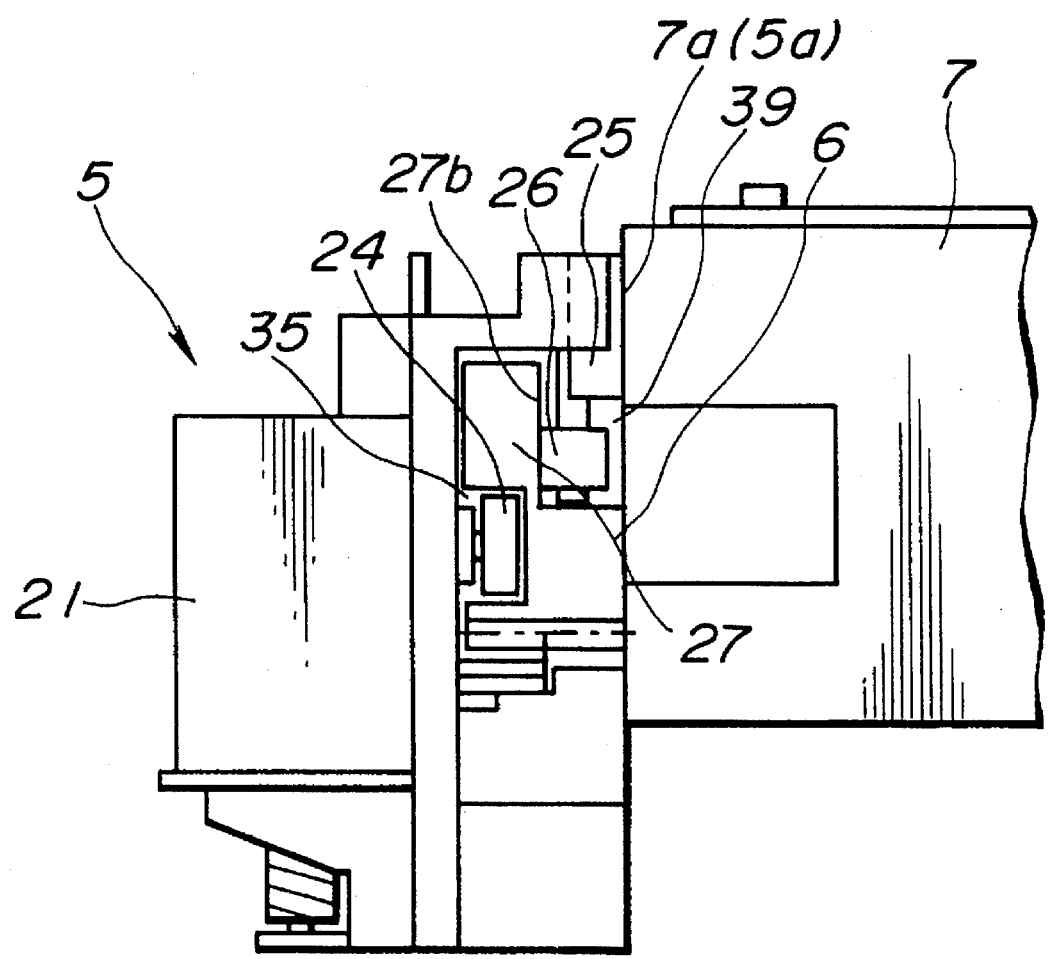
FIG. 8 is a side view of the pickup carrier of FIG. 5.

The guide rollers 22, 23 and 24 of the optical block 5 in the inverted state are inserted into the guide groove 35 of the guide member 6 from the central (radial inner) end of the upper guide groove section 37. At the same time, the rollers 25 and 26 provided in the second (lower) projection 16 of the inverted optical block 5 are inserted into a gap 39 formed between the vertical reference surface 7a of the support member 7 and a rear surface 27b of a guide rail 27. The guide rail 27 of this example is an integral part of the guide member 6, and extends along the outer periphery of the guide groove 35. In this state, as shown in FIG. 8, the guide rail 27 of the guide member 6 is clamped between the holding roller 26 and the set of the guide rollers 22, 23 and 24.

The guide rollers 25 provided in the lower and upper projections 15 and 16 are held in contact with the forwardly facing vertical reference surface 7a of the support member 7. The holding roller 26 is held in contact with the rearwardly facing rear surface 27b of the guide rail 27 of the guide member 6. The rear surface 27b of the guide rail 27 confronts the reference surface 7a of the support member 7. The rollers 25 hold the references surfaces 5a of the optical block 5 parallel to the reference surface 7a of the support member, and the holding roller 26 prevents the optical block 5 from moving in the direction normal to the reference surface 7a. In this way, the optical block 5 moves along a path in the form of a plane curve which is defined, in a stationary plane parallel to the reference surface 7a, by the guide groove 35. The pinion 19 of the optical block 5 is in mesh with the rack 34 of the guide member 6, so that the optical block 5 may be driven along the groove 35.

Figure 3:
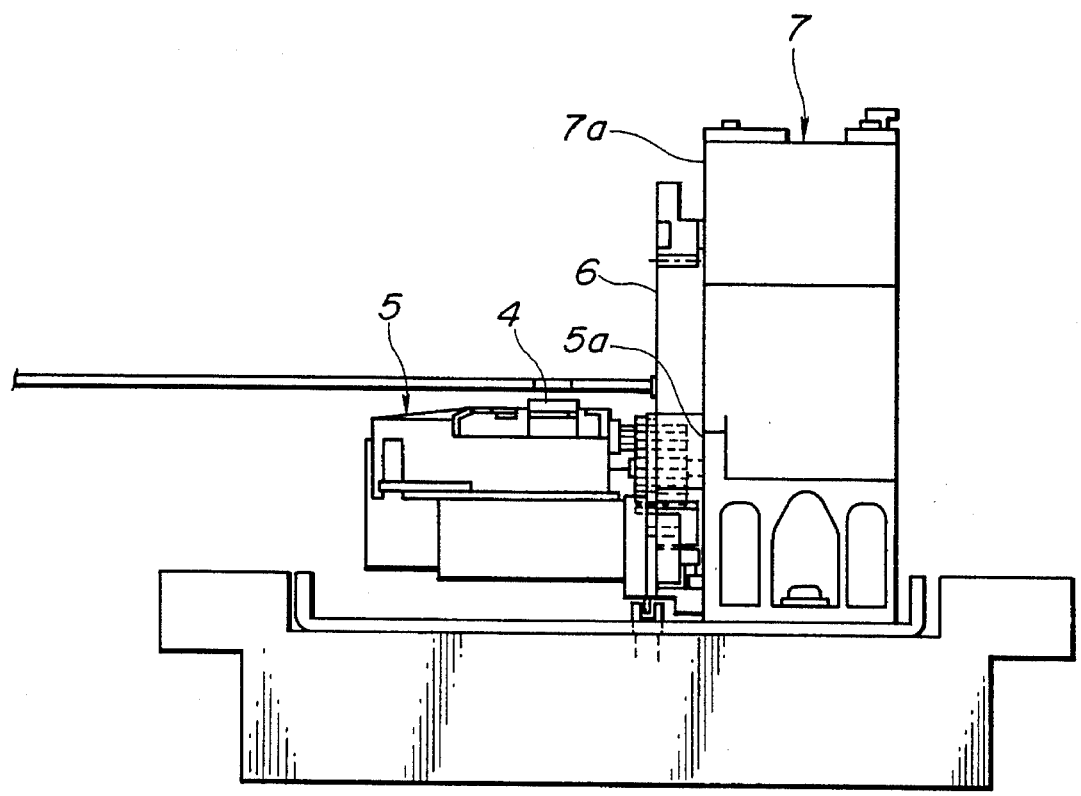
FIG. 3 is a side view of the pickup guide mechanism of FIG. 1.
Figure 4:
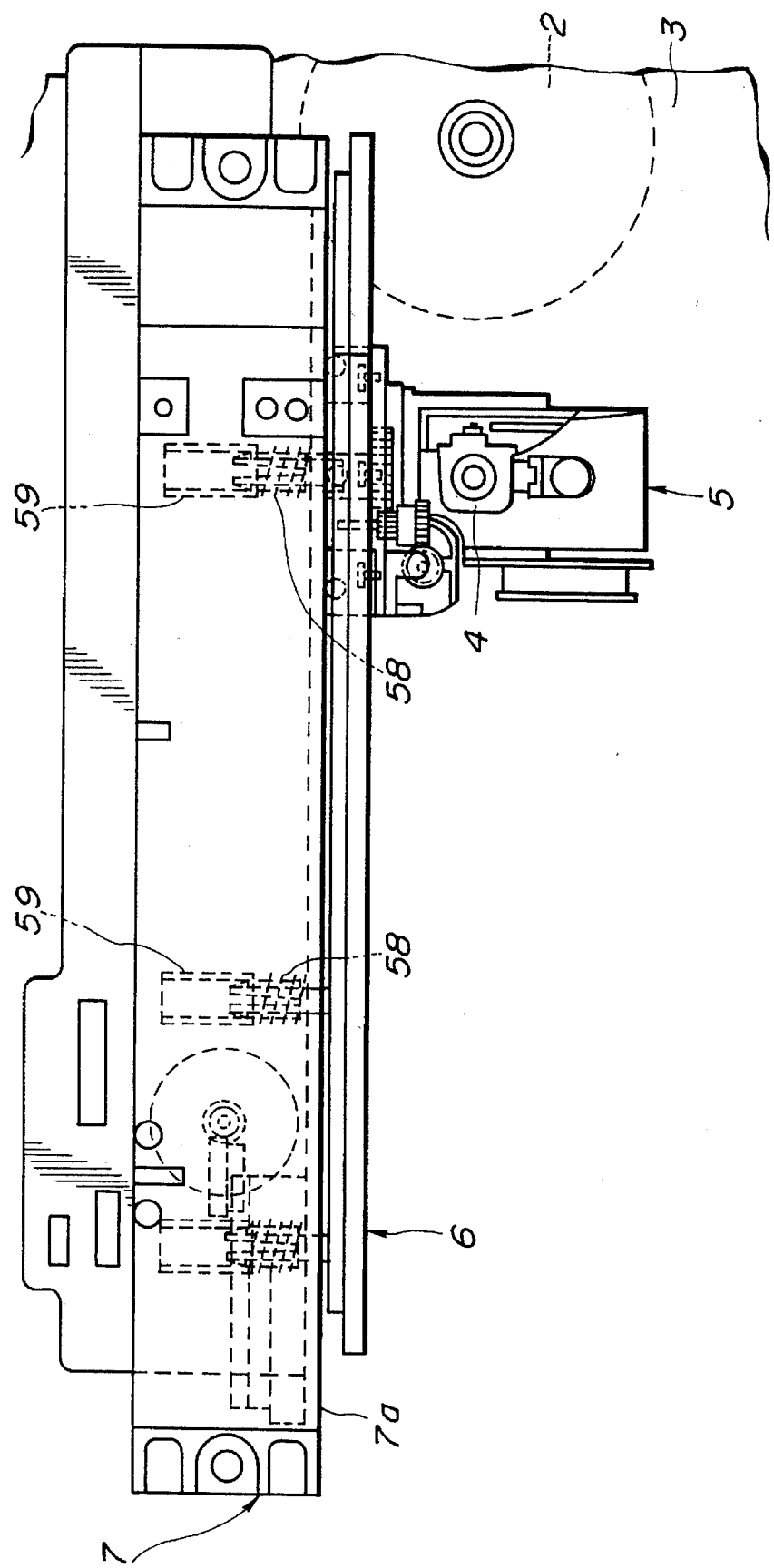
FIG. 4 is a plan view of the pickup guide mechanism of FIG. 1.

The optical block 5 is pulled toward the vertical reference surface 7a by the compression coil springs 58 via the guide member 6. The reference surfaces 5a of the optical block 5 are held in parallel with the reference surface 7a of the support member 7. The optical block 5 projects forwardly from the reference surface 7a of the support member 7, and is supported only at the rear end by the support member 7 through the guide member 6, as shown in FIGS. 1 and 3. The front end of the optical block hangs free like a cantilever.

Figure 2:
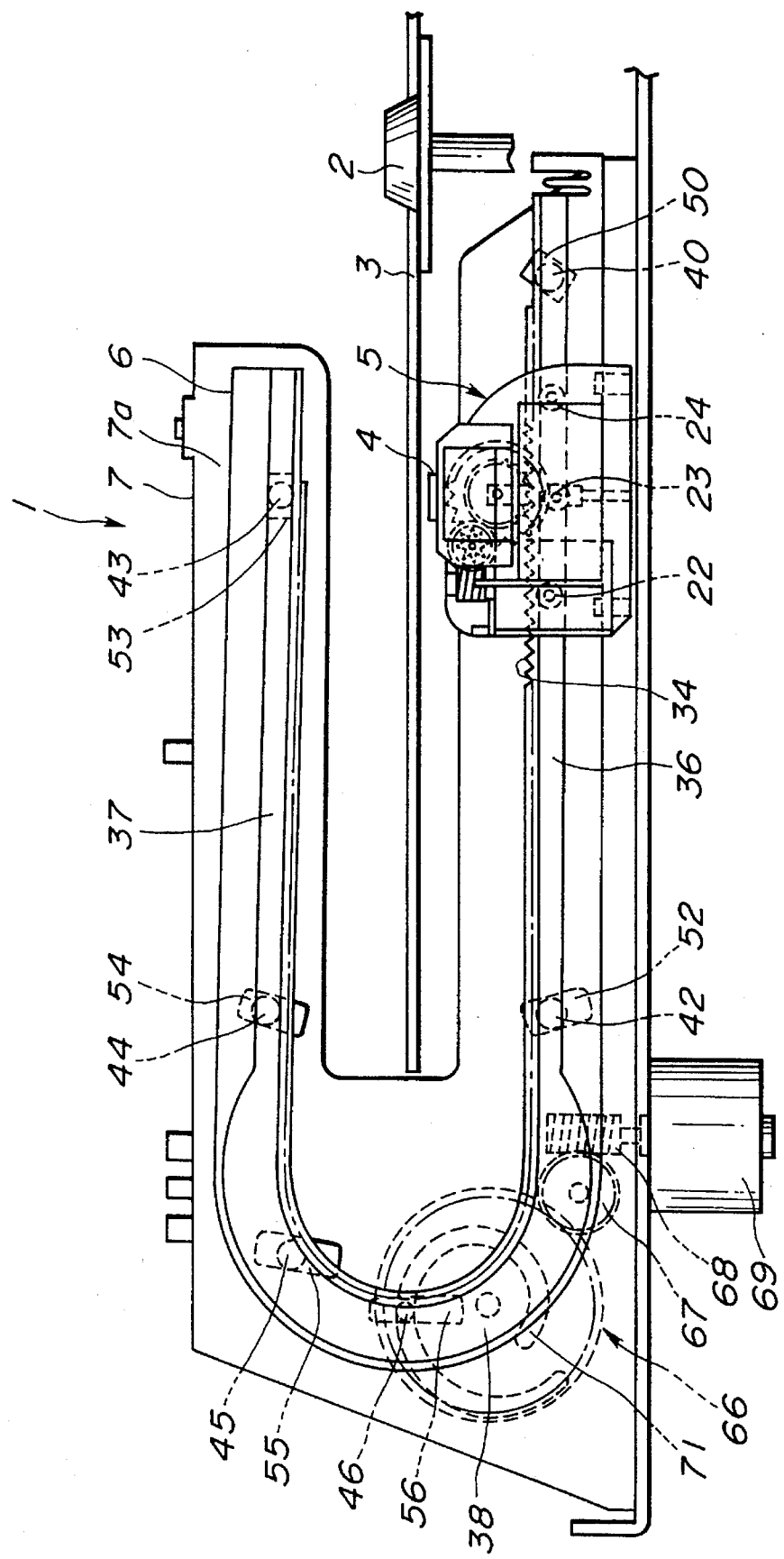
FIG. 2 is a front view of the pickup guide mechanism of FIG. 1.

The support member 7 is substantially U-shaped like the guide member 6, and has upper and lower horizontally extending arms between which the optical disk 3 is to be placed as shown in FIGS. 1 and 2. The support member 7 is fixed to a chassis 62, shown in FIG. 9, by screw fasteners 61. The support member 7 stands upright on the chassis 62. The reference surface 7a of the support member 7 is stationary and vertical relative to the chassis 62. The reference surface 7a is parallel to the vertically extending axis of the turn table 2.

The support member 7 has a front side wall defining the above-mentioned vertical reference surface 7a. The front side wall of the support member 7 is formed with the pin holes 50–56 at positions corresponding to the positions of the tilt pins 40–46. Each of the pin holes 50–56 is elongated in a direction tangent to one of several imaginary concentric circles in the vertical reference surface 7a. The imaginary common center of the imaginary concentric circles is located at the elevation of the optical disk 3 placed on the turn table 2, and in the central portion of the optical disk 3. In this way, the pin holes 50–56 are elongated in such a manner as to allow the guide member 6 to swing up and down to a limited extent about an imaginary pivot axis which passes through the above-mentioned imaginary common center. This pivot axis is substantially perpendicular to the vertical reference surface 7a. The imaginary pivot axis in this example extends in the imaginary disk rotation plane near the imaginary disk rotation axis (or the axis of the turntable 2). The imaginary pivot axis is located vertically midway between the lower and upper guide groove sections 36 and 37. The imaginary pivot axis is intermediate horizontally (or radially of the optical disk 3) between the arched groove 38 and the axis of the turn table 2.

A rotary cam 66 for tilting the guide member 6 is provided on the rear side of the front wall of the support member 7, behind the arched guide groove section 38, as shown in FIGS. 2 and 9. The rotary cam 66 is mounted on a shaft 65 supported by the support member 7. The rotary cam 66 is rotatable on an axis perpendicular to the vertical reference surface 7a. The rotary cam 66 is driven by a tilt motor 69 through a worm wheel 67 and a worm 68 shown in FIGS. 2 and 9. The rotary cam 66 has a spiral (tilt) cam groove 71, formed in the front surface of the cam 66, for receiving the projecting end of the tilt pin 46.

Figure 12:
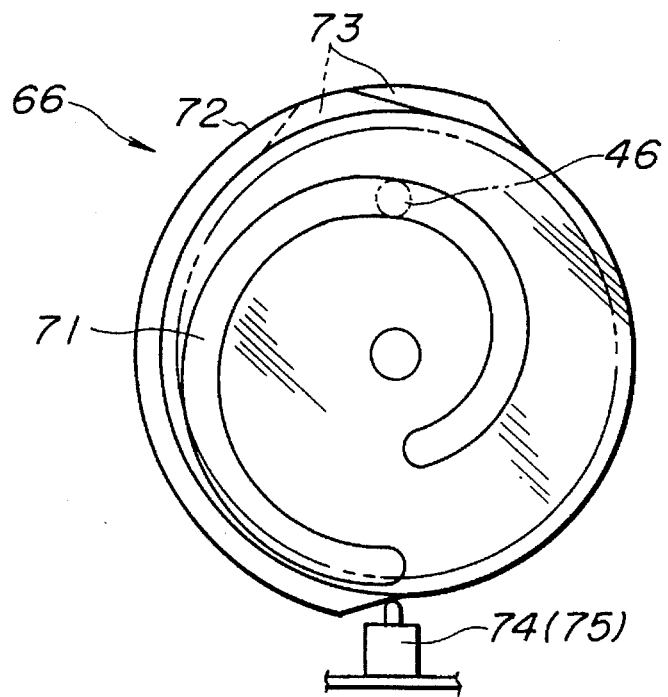
FIG. 12 is a front view of a rotary cam employed in the guide mechanism shown in FIG. 1.

As shown in FIG. 12, the tilt cam groove 71 winds through about 360° around the axis of the rotary cam 66 in such a manner as to describe a spiral in a vertical plane parallel to the reference surface 7a. The guide member 6 is held in the neutral angular position when the tilt pin 46 is located in the middle point of the spiral groove 71 which is equally distant from the inner and outer ends of the groove 71. The angular distance between the middle point and each of the inner and outer ends of the cam groove 71 is approximately equal to 180°. When the guide member 6 is in the neutral position, the lower and upper straight groove sections 36 and 37 are inclined symmetrically with respect to the imaginary reference horizontal plane which is perpendicular to the axis of the turn table 2 and which extends between the upper and lower surfaces of the optical disk 3, and divides the optical disk 3 into upper and lower halves, each a mirror image of the other. Thus, in the neutral position, the lower and upper straight groove sections 36 and 37 extend, respectively, along lower and upper inclined straight lines each of which is an mirror image of the other with respect to the reference horizontal plane.

When the rotary cam 66 is rotated in the clockwise direction as viewed in the front view of FIG. 12, from the neutral position, the tilt pin 46 slides along the spiral groove 71 toward the outer end, and the radial distance between the tilt pin 46 and the axis of the cam 66 increases gradually. In this example, the axis of the cam 66 is located below the tilt pin 46 as shown in FIG. 2. Therefore, the arched guide portion 33 of the guide member 6 is raised to a higher potion, and the guide member 6 is swung upwardly. The peripheral outer end of the lower straight groove section 36 becomes closer to the outer portion of the optical disk 3 on the turn table 2, and the peripheral outer end of the upper straight groove section 37 becomes more remote from the outer portion of the optical disk 3.

When the rotary cam 66 is rotated oppositely in the counterclockwise direction from the neutral position, the arched portion 33 is lowered, and the guide member 6 is swung downwardly. The outer end of the upper straight groove section 37 approaches the optical disk 3 on the turn table, and the outer end of the lower straight groove section 36 moves away from the optical disk 3.

Figure 13:
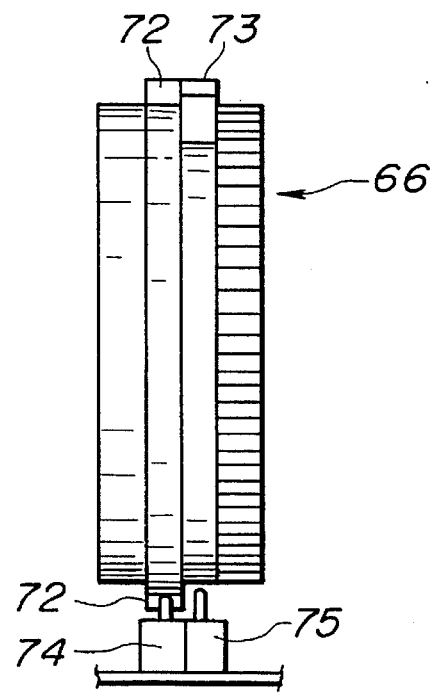
FIG. 13 is a side view of the rotary cam of FIG. 12.
Figure 14:
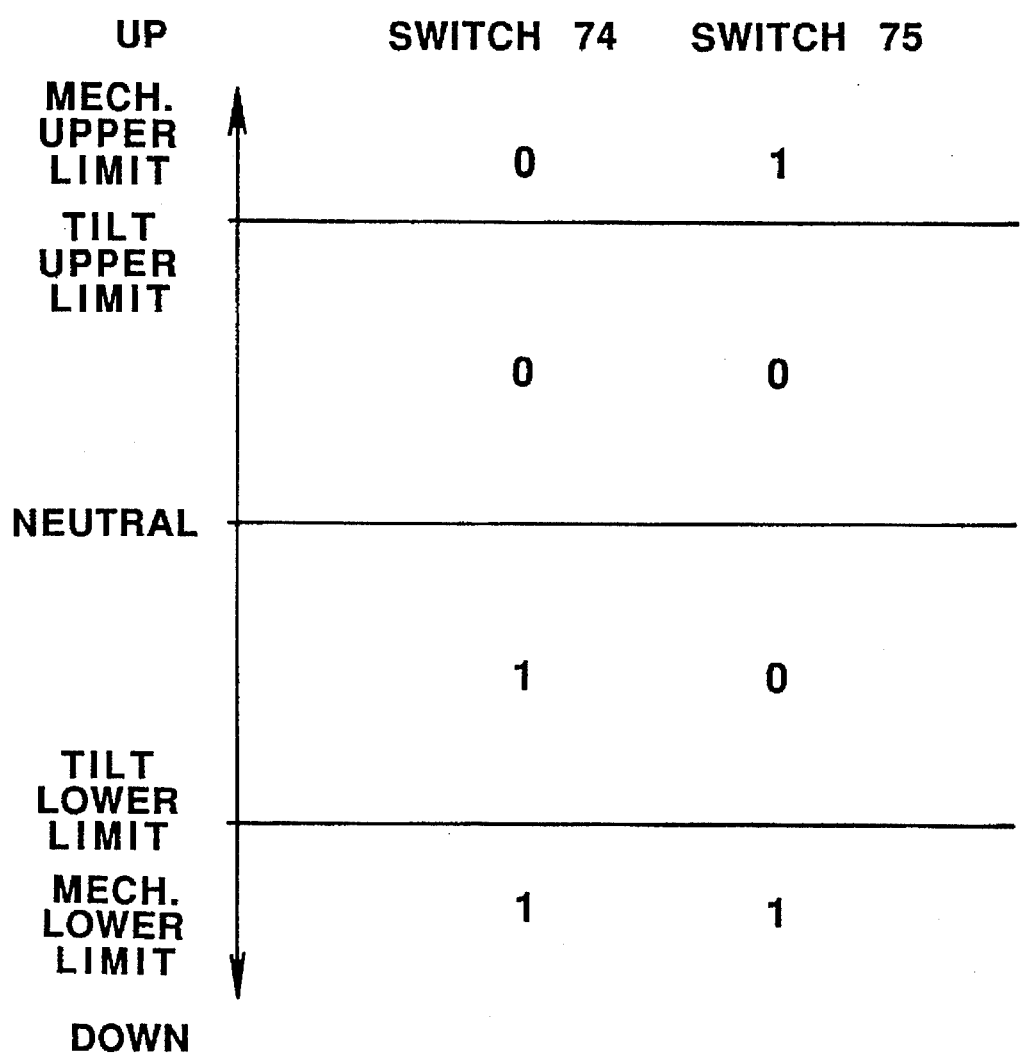
FIG. 14 is a diagram illustrating the relation between the on and off state of the tilt position detecting switches and the tilt position of the guide member shown in FIG. 11.

As shown in FIGS. 12 and 13, the rotary cam 66 has first and second cam projections 72 and 73 which are both formed on the outside peripheral surface of the cam 66. The first and second cam projections 72 and 73 are juxtaposed along the axial direction of the cam 66 as shown in FIG. 13. First and second tilt position detecting switches 74 and 75 are juxtaposed under the rotary cam 13, as shown in FIG. 13, and arranged to be switched on and off, respectively, by the first and second cam projections 72 and 73.

The first cam projection 72 extends circumferentially about through 180° around the axis of the cam 66 so as to describe a semicircle. The second cam projection 73 extends circumferentially only through about 40°, and overlaps the first cam projection 72 so that a part of the second projection 73 extends side by side with the first projection 72 along the same segment of the circumference of the cam 66.

When the tilt pin 46 is in the middle point of the spiral groove 71, and hence the guide member 6 is in the neutral position, then one end of the first cam projection 72 is at the position of the first tilt detecting switch 74.

When the cam 66 rotates in the clockwise direction, the first tilt detecting switch 74 is disengaged from the first cam projection 72, and then held in the OFF state while the guide member 6 is tilted in the upward direction to raise the arched portion 33. When the amount of rotation of the cam 66 reaches a predetermined angle of about 160°, the second cam projection 73 turns on the second tilt detecting switch 75 to signal an upper limit of the tilting movement of the guide member 6.

On the other hand, the first tilt detecting switch 74 is held in the ON state by the first cam projection 72 while the cam 66 rotates in the counterclockwise direction from the neutral position, and causes the guide member 6 to tilt in the downward direction to lower the arched guide portion 33. When the angular distance traveled by the cam 66 reaches a predetermined angle of about 160°, the second tilt detecting switch 75 is turned on by the second cam projection 73 to signal the arrival at a lower tilt limit of the tilting movement of the guide member 6.

The guide member 6 is automatically returned to the neutral position with the cam 66 when the optical block 5 is inverted.

Figure 15:
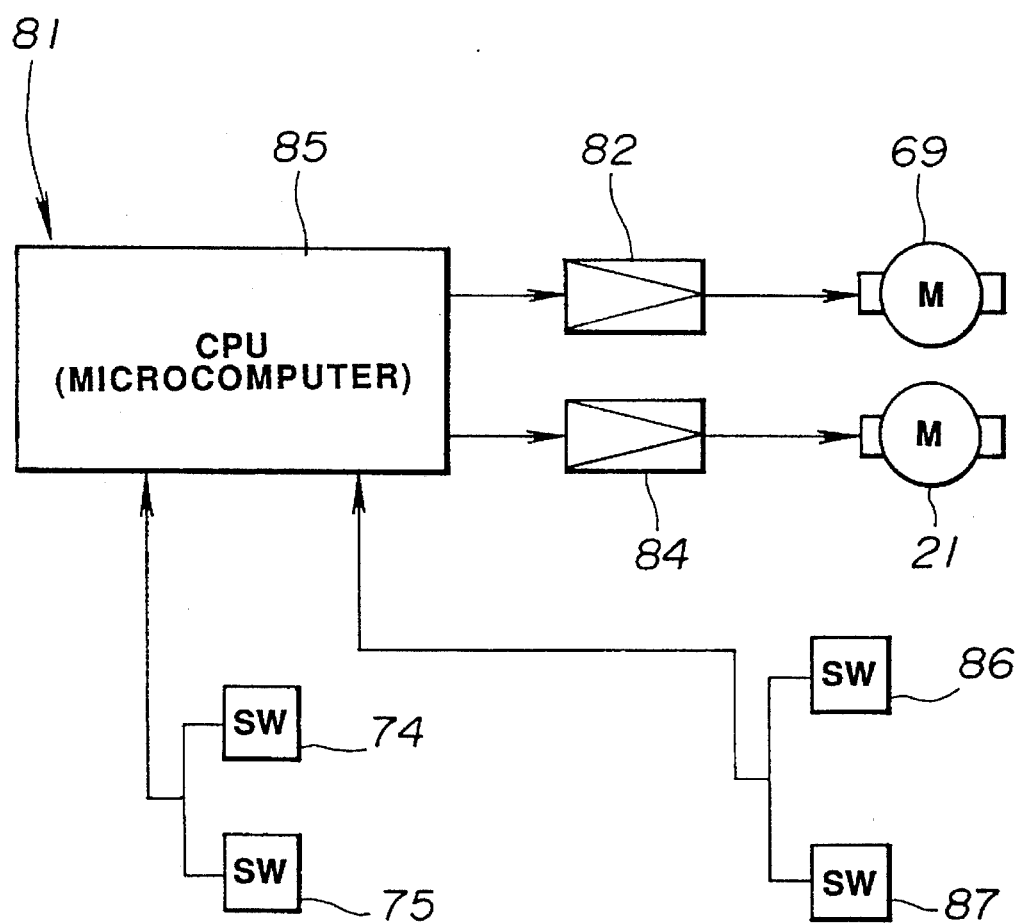
FIG. 15 is a block diagram showing a control circuit employed in the disk player according to the embodiment of the present invention.

The disk player of this illustrated example further includes a control circuit 81 shown in FIG. 15. The control circuit 81 includes the above-mentioned tilt motor 69, the feed motor (or transfer motor or thread motor) 21, a tilt motor driver (circuit) 82, a feed motor driver (circuit) 84, a microcomputer including a CPU 85, the above-mentioned first and second tilt detecting switches 74 and 75, and first and second innermost position (in limit) detecting switches 86 and 87 for detecting the innermost positions of the lower and upper (A and B) sides of the disk.

Figure 16:
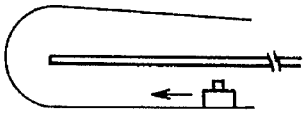
Figure 16:
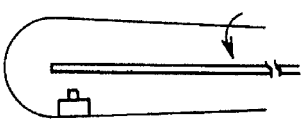
Figure 16:
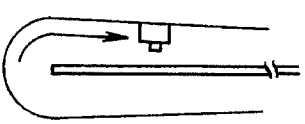
Figure 16:
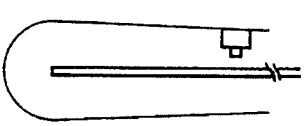
Figure 16:
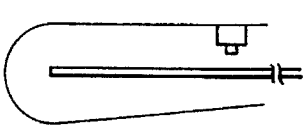

As shown in FIG. 16, the control circuit 81 controls the tilt and feed (transfer) motors 69 and 21 in different operating modes. In an A side play mode, the guide member 6 is held in a tilt up state in which the lower guide section 31 is controlled parallel to the disk 3 by the CPU 85. In this state, the A side play is performed by moving the pickup 4 radially outwardly from the innermost position on the A side.

After the A side play, the control circuit 81 returns the guide member 6 from the tilt up position to the neutral position.

When the guide member 6 is returned to the neutral position, the control circuit 81 causes the pickup 4 to move from the lower guide section 31 to the upper guide section 32 via the arched guide section 33.

When the B side innermost position is reached by the pickup 4, the control circuit 81 causes the guide member 6 to swing down to a tilt down position in which the upper guide section 32 is controlled parallel to the disk 3 by the CPU 85. In this state, the B side play is performed.

Figure 28:
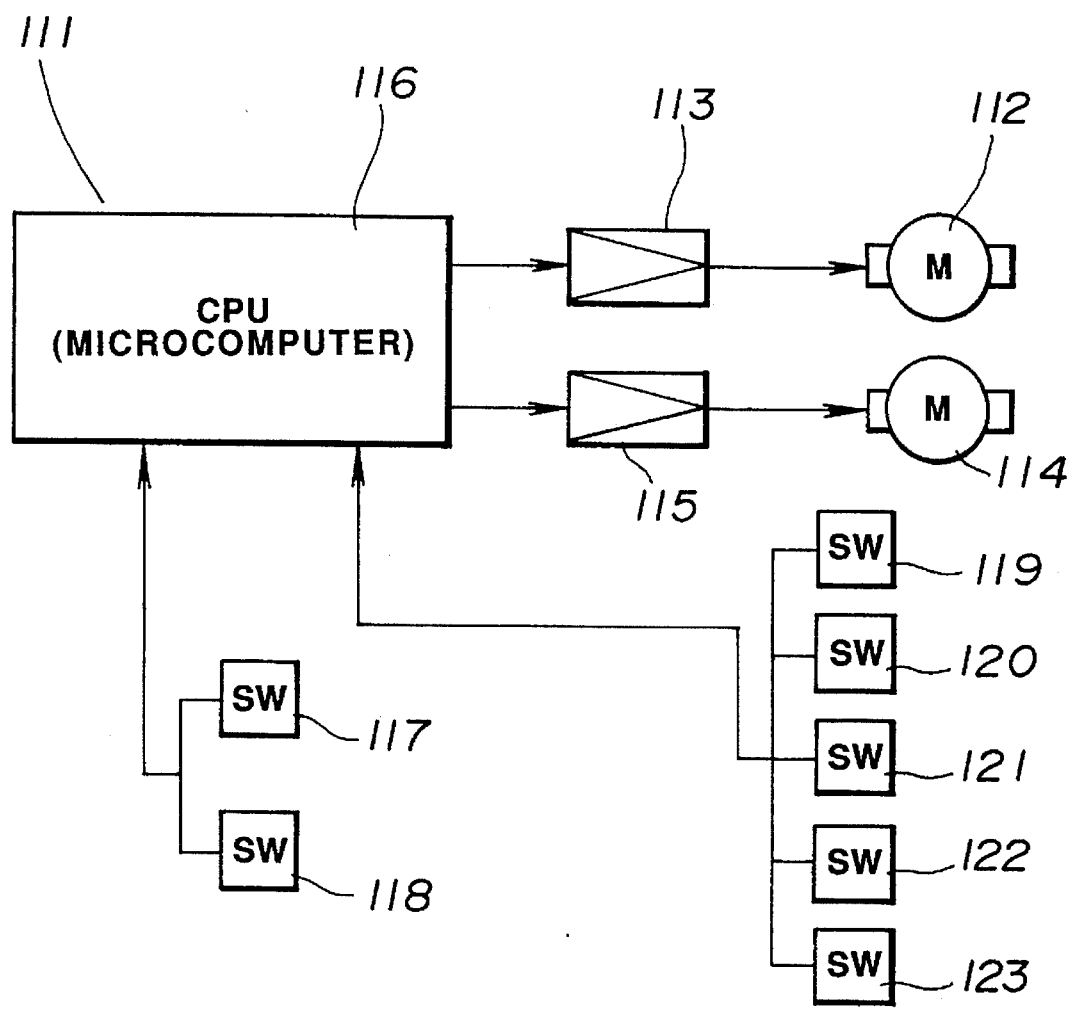
FIG. 28 is a circuit diagram similar to FIG. 15, but showing a conventional control circuit.

The thus-constructed control circuit 81 requires less detecting switches than the conventional control circuit 111 shown in FIG. 28. In the disk player of this embodiment, it is possible to omit the feed A side detecting switch, the feed B side detecting switch, and the feed outer circumference detecting switch. Therefore, the control circuit 81 of this embodiment is advantageous in cost, and simple in construction. Furthermore, the disk player of this embodiment can reduce the time required for a transition from the A side play to the B side play or vice versa. The disk player of this embodiment can perform reproducing operations of the double sided disk 3 rapidly and promptly.

If an inclination of the disk 3 is detected by the tilt sensor 11 during playing, the rotary cam 66 is rotated by the tilt motor 69 to swing the guide member 6 up or down in accordance with the inclination of the disk 3. In this way, the optical axis of an objective lens of the pickup 5 is always held perpendicular to the light reflecting surface of the disk 3 during playing, so that the laser beam can always impinge on the disk at right angles.

Figure 17:
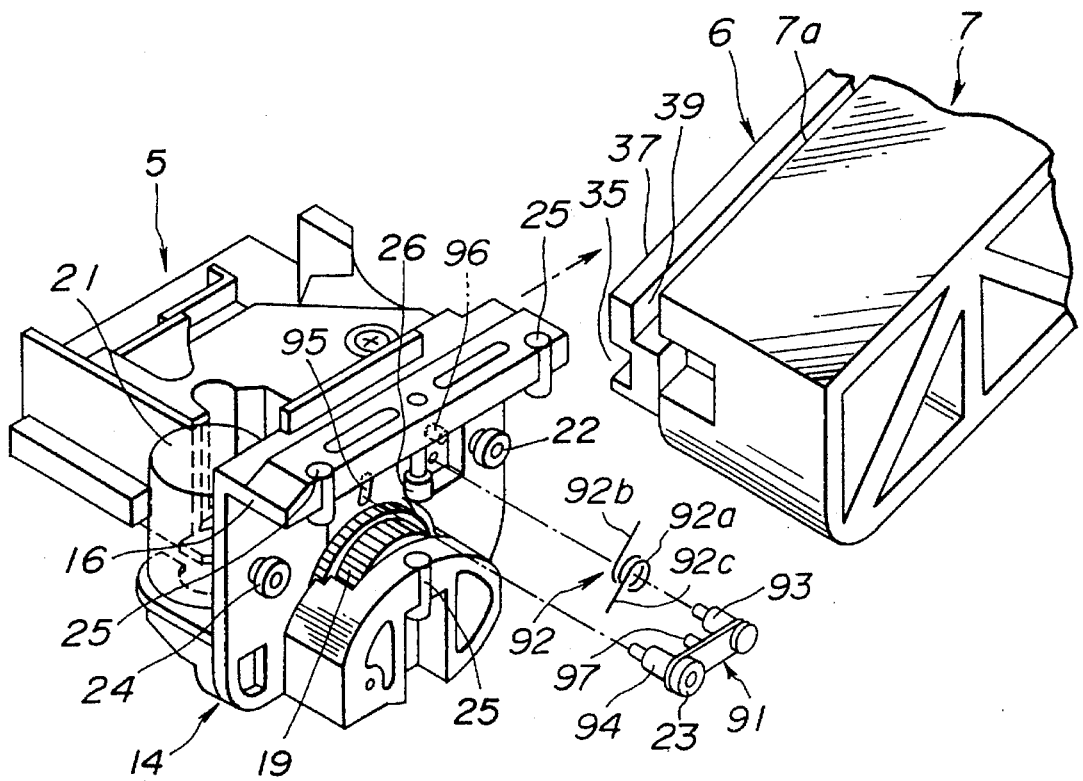
FIG. 17 is a perspective view showing a modification of the pickup carrier 5 shown in FIG. 6.
Figure 18:
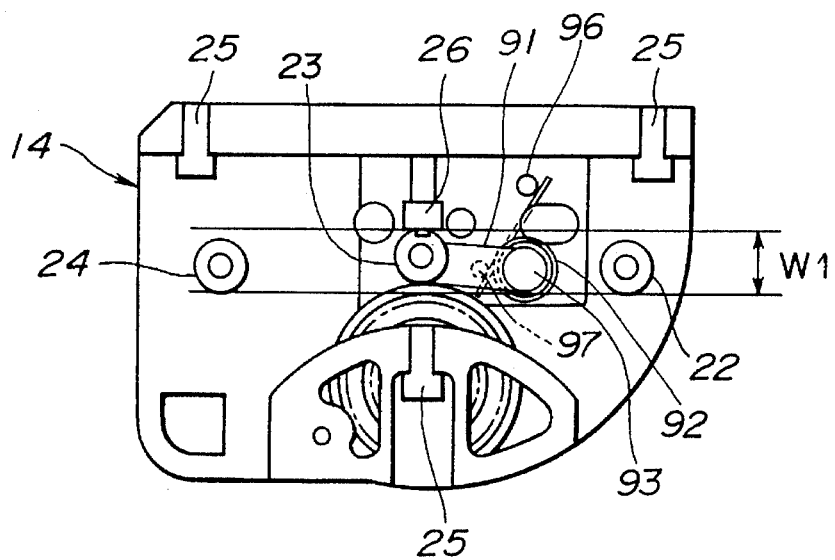
FIG. 18 is an elevation of the pickup carrier shown in FIG. 17.

FIGS. 17 and 18 show a modification of the pickup carrier 5. The pickup carrier 5 shown in FIGS. 17 and 18 has an elastic supporting setup (or supporting means) for supporting the guide rollers 22, 23 and 24 in such a manner that the offset distance between the axis of the middle guide roller 23 and the plane containing the axes of the outer guide rollers 22 and 24 is variable. In this example, the elastic support setup includes a swingable support arm 91 for supporting the middle guide roller 23, and a spring 92 for urging the support arm 91 toward one of the guide groove side walls. The support arm 91 is swingable on a swing axis which is substantially parallel to the axis of the middle guide roller 23. The middle guide roller 23 is swingable in the widthwise direction of the guide groove 35. The spring 92 is arranged to apply a spring force on the arm 91 in such a rotational direction as to increase the above-mentioned offset distance or the width W1 of the guide roller arrangement.

The roller support arm 91 has a first end which is pivotally joined to the optical block 5 by a pivot shaft 93, and a second end on which the middle guide roller 23 is mounted. The arm 91 is rotatable on the pivot shaft 93. There is formed, in the second end of the arm 91, a projection 94 for limiting the swing movement of the arm 91. The projection 94 is slidably received in a groove 95 formed in the optical block 5. The groove 95 is designed to limit the rotational movement of the middle guide roller 23.

The spring 92 of this example is a torsion coil spring. The spring 92 has a coil 92a which is mounted on the pivot shaft 93, a first spring end 92a which is retained by a spring retaining portion 96 formed in the optical block 5, and a second spring end 92c which is retained by a spring retaining portion 97 formed in the support arm 91. The spring 92 applies, on the arm 91, a rotational force tending to rotate the arm 91 in the clockwise direction as viewed in FIG. 18.

Therefore, the roller support arm 91 swings by the action of the spring 92 until the projection 94 abuts on one end of the groove 95. In this state in which the roller support arm 91 is fully swung, the width W1 is the guide roller arrangement is greater than the groove width W2 of the second groove section 37 of the guide groove 35.

The optical block 5 and the guide member 6 are assembled as shown in FIG. 17. First, the first guide roller 22 is inserted into the upper section 37 of the guide groove 35. Then, the middle guide roller 23 follows. The middle guide roller 23 is pushed down by the end of the second groove section 37, and the roller support arm 91 is swung inwardly against the force of the spring 92. In this way, the middle guide roller 23 is readily inserted into the guide groove 35. Finally, the third guide roller 24 is inserted into the guide groove 35.

In the guide groove 35, the spring 92 pushes the middle guide roller 23 against one side wall of the groove 35, while pushing the first and third guide rollers 22 and 24 against the other side wall. With the guide rollers 22, 23 and 24 being pressed against the opposite side walls of the guide groove 35, the optical block 5 can move smoothly and accurately along a predetermined path all the way from the inner end of the upper groove section 37 via the arched groove section 38 to the inner end of the lower groove section 36. Even if the guide groove 35 is irregular and inaccurate specifically in the groove width, the elastic guide roller supporting setup shown in FIGS. 17 and 18 ensures the smooth and accurate movement of the optical block 5.

FIGS. 19–26 show a disk loading and chucking mechanism 201 of the disk player according to this embodiment. This mechanism 201 includes a chucking mechanism, a loading mechanism, and a control section for controlling the motion of each of the chucking and loading mechanism.

The chucking mechanism includes a chucking member 202, a lifting mechanism (linkage) 203 for moving the chucking member 202 up and down, and an operating cam plate (or translational cam plate) 205 formed with a chucking cam groove 204.

The control section includes, as a main component, a control gear member 207 which is arranged to cause the cam plate 205 to move translationally, and to cause the loading section to perform loading and unloading operations of a disk 206 such as a double-sided optical disk. The control gear member 207 includes a disk cam 208, and the control section further includes switches 209, 210 and 211 for monitoring the loading state and the chucking state by detecting an angular position of the control gear member 207.

The chucking member 202 is made of magnetic material. In the underside of the chucking member 202, there is provided a centering member (not shown) for centering the upper side (B side) 206a of the disk 206.

Figure 19:
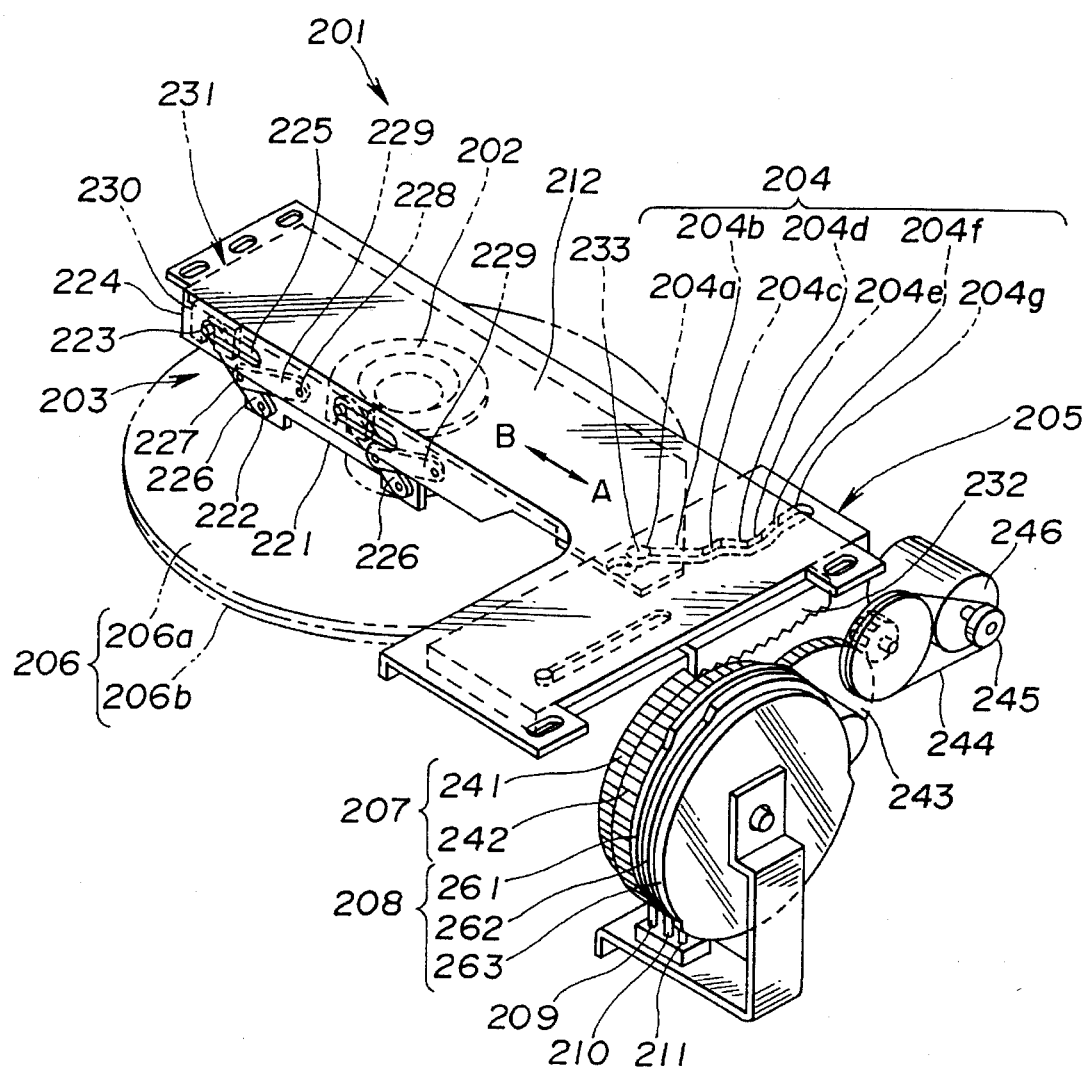
FIG. 19 is a perspective view showing a loading and chucking mechanism in an unchucking state, employed in the disk player according to the embodiment of the present invention.

The lifting mechanism 203 is hung from, and supported by, a horizontal frame member 212 located above the turntable (not shown in FIG. 19). The lifting mechanism 203 includes a rectangular chucking plate 221 supporting the circular chucking member 202, a set of four first bars (or arms) 226, a set of four second bars (or arms) 229 and a slider plate 231.

Each of the first bars 226 has a lower end which is pivotally joined through a pin 222 with a unique one of the four corners of the horizontally-held chucking plate 221, and an upper end which is movably joined with the frame member 212. The horizontal frame member 212 has two downward flanges 224 projecting downwards on both sides. Each flange 224 is formed with two slots 225. The upper end of each first bar 226 has a pin 223 which is slidably received in a unique one of the four slots 225.

Each of the second bars 229 has a lower end which is pivotally joined with the middle of a unique one of the four first bars 226 by a pin 227, and an upper end which is pivotally joined with one of the flanges 224 by a pin 228. In this way, the rectangular chucking plate 221 is supported at the four corners by the bar linkage of the first and second bars 226 and 229.

The slider plate 231 is supported under the horizontal frame member 212. The slide plate 231 extends longitudinally along an imaginary lateral line (or second slide direction) which is horizontal and substantially parallel to the axis of the control gear member 207. The slide plate 231 has four lugs 230 each of which projects downwards, and is pivotally joined with the upper end of a unique one of the four first bars 226 by the associated pin 223. The slots 225 of the frame member 212 are elongated along the imaginary lateral line (second slide direction), that is, the lengthwise direction of the slider plate 231. Therefore, the slide plate 231 is slidable left and right along the imaginary lateral horizontal line, together with the pins 223 in the slots 225.

When the slider plate 231 slides in a rightward direction, shown by an arrow A in FIG. 19, along the imaginary lateral line (A-B), then the bar arrangement of the first and second bars 226 and 229 lowers the chucking plate 221 and the chucking member 202 toward the disk 206. When the slider plate 231 slides in a leftward direction, shown by an arrow B, then the bar linkage of the first and second bars 226 and 229 raises the chucking plate 221 and the chucking member 202 toward the frame member 212.

The operating plate (or translational cam plate) 205 is slidably supported under the frame member 212. The operating plate 205 extends, and is slidable back and forth, along an imaginary horizontal front and rear line (or first slide direction) which is perpendicular to the imaginary horizontal lateral line (A-B). The frame member 212 of this example is in the form of an L-shaped plate, and has a first portion extending along the lateral line and covering the slide plate 231, and a second portion extending along the front and rear line and covering the operating plate 205.

The operating plate 205 has a flange in the form of a rack 232 meshing with the control gear 207. With this rack 232, rotation of the control gear member 207 causes translational motion of the operating plate 205 along the imaginary front and rear line. The axis of the control gear member 207 is horizontal and substantially parallel to the lateral line (A-B) along which the slide plate 231 slides. The front and rear line along which the operating plate 205 slides is in an imaginary vertical plane which is perpendicular to the axis of the control gear member 207. The operating plate 5 is formed with the above-mentioned chucking cam groove 204 which receives a follower pin 233 fixed to a right end of the slide plate 231.

The chucking cam groove 204 of this example consists of a first section 204a for holding the chucking member 202 at an unchucking position; a second section 204b for lowering the chucking member 202 from the unchucking position to a lower side chucking position for the A (lower) disk side 206b; a third section 204c for holding the chucking member 202 at the lower side chucking position; a fourth section 204d for further lowering the chucking member 202 to an upper side centering position for centering the upper (B) side 206a of the disk 206 with the centering member provided in the chucking member 202; a fifth section 204e for holding the chucking member 202 at the upper side centering position; a sixth section 204f for raising the chucking member 202 from the upper side centering position to a upper side chucking position for chucking the upper (B) side 206b of the disk 206; and a seventh section 204g for holding the chucking member 202 at the upper side chucking position. These seven groove sections 204a 204g constitute the chucking cam groove 204 which is a single continuous groove.

Figure 21:
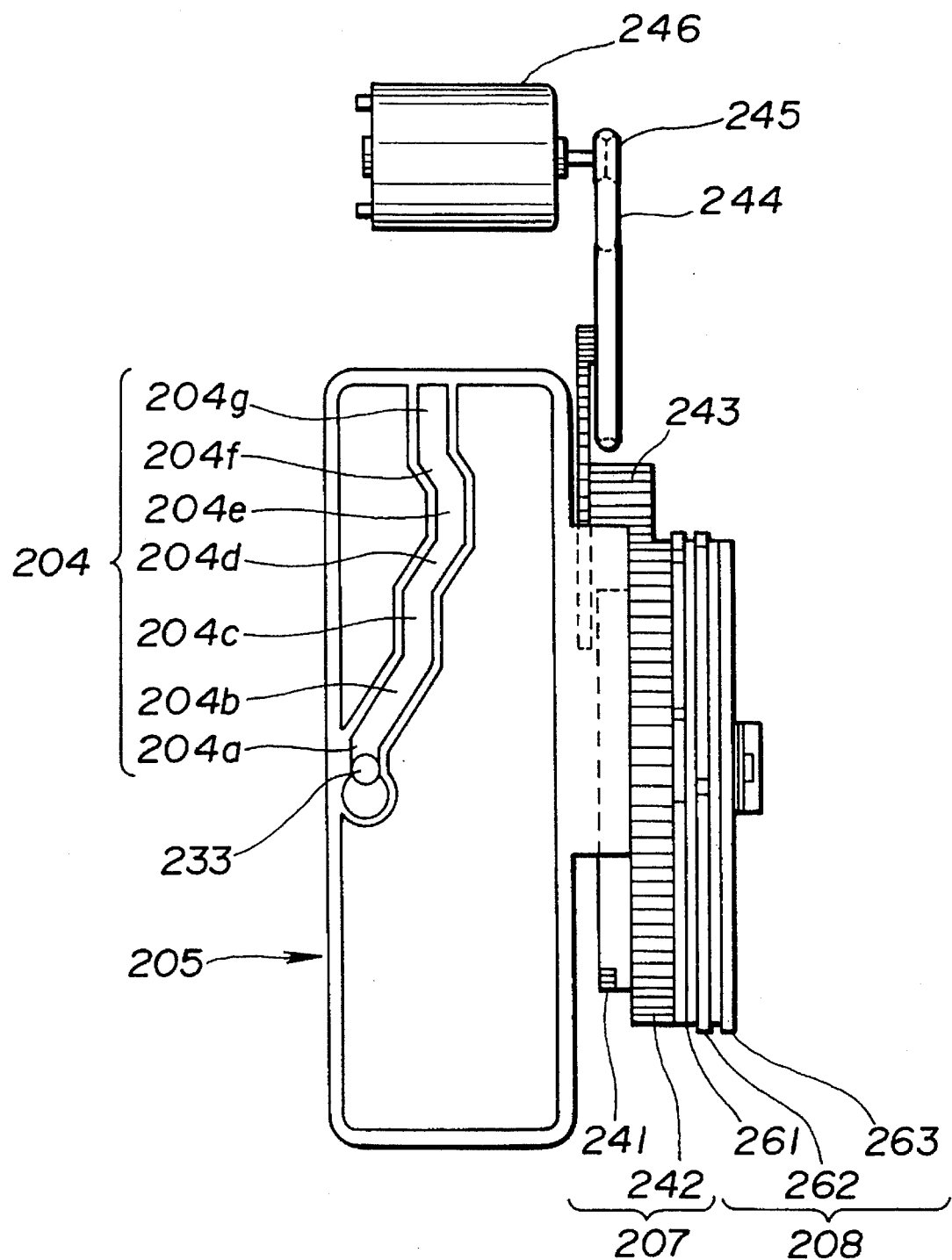
FIG. 21 is a plan view of an operating plate of the loading and chucking mechanism of FIG. 19.

These groove sections 204a–204g are continuously connected end to end in the order of 204a–204g. Each of the first, third, fifth and seventh cam groove sections 204a, 204c, 204e and 204g extends along the imaginary front and rear line, that is the longitudinal direction of the operating plate 205, as shown in FIG. 21. Therefore, in each of these (odd-lettered) groove sections 204a, 204c, 204e and 204g, the cam follower pin 233 rests or dwells, and holds the slider plate 231, the linkage 203 and the chucking member 202 motionless. The remaining (even-lettered) groove sections 204b, 204d and 204f are all oblique. The second and fourth groove sections 204b and 204d are sloping in the same direction, and the sixth groove section 204f is sloping in the opposite direction. The operating plate 205 of this example has right and left parallel side surfaces extending along the lengthwise direction (first slide direction) of the operating plate 205. The right (first lateral) side surface faces toward the control gear 207, and the left (second lateral) side surface faces in the opposite direction. The first cam groove section 204a is closest to the left side surface of the operating plate 205, and the fifth cam groove section 204e is closest to the right side surface or the control gear member 207. The center line along which the third groove section 204c extends is located between the center lines of the first and fifth groove sections 204a and 204e, as shown in FIG. 21. In this example, the center line of the seventh groove section 204g is between the center lines of the fifth section 204e and the third section 204c.

Figure 20:
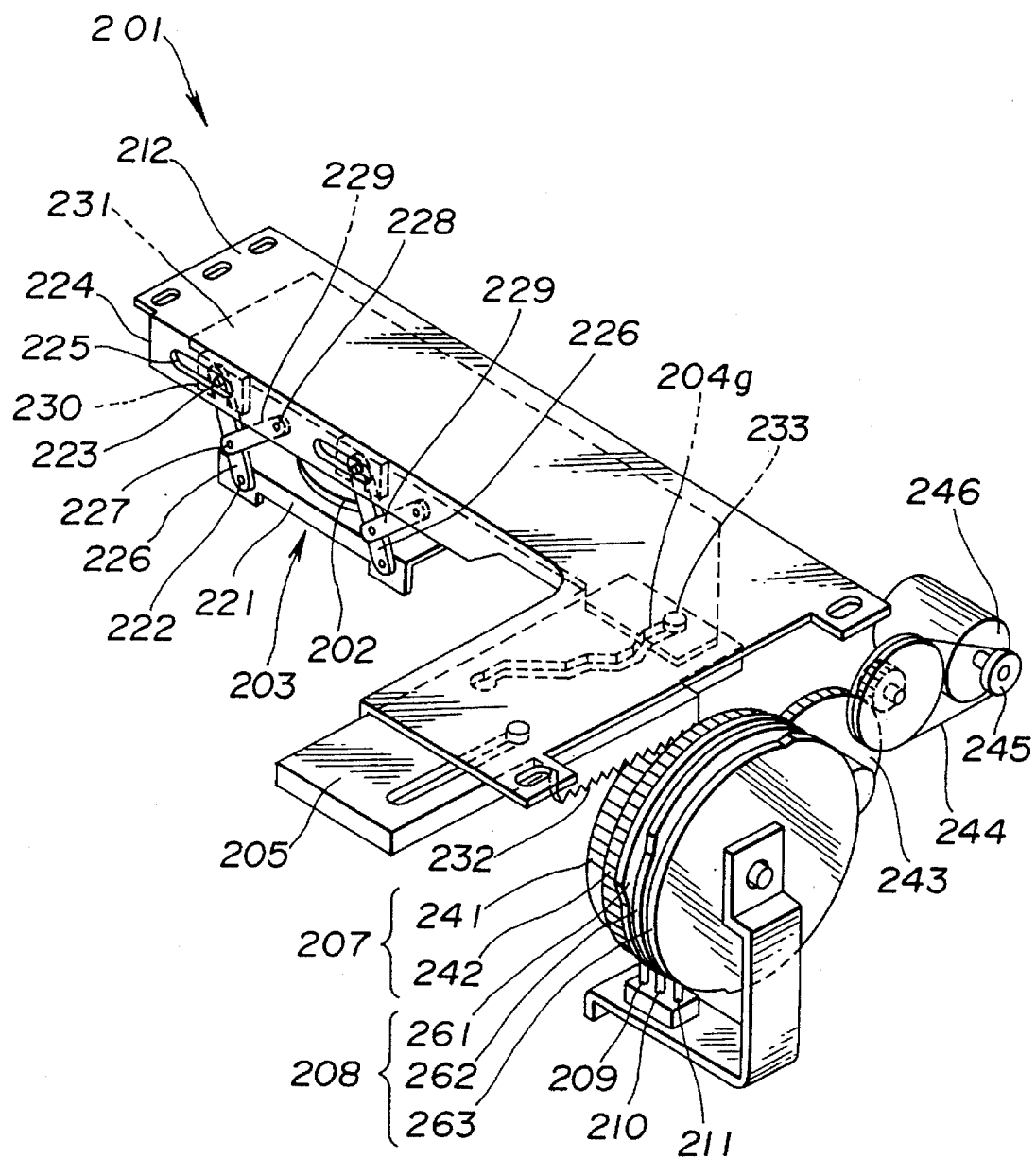
FIG. 20 is the loading and chucking mechanism of FIG. 19 in a B side chucking state.

The chucking operation of the A (lower) side 206b of the disk 206 is finished when the operating plate 205 moves from the position in which the follower pin 233 is located in the first groove section 204a, as shown in FIG. 19, and reaches the position in which the follower pin 233 is in the third groove section 204c. In the state in which the follower pin 233 is received in the seventh groove section 204g, as shown in FIG. 20, the chucking operation of the B (upper) side 206a of the disk 206 is over.

Figure 22:
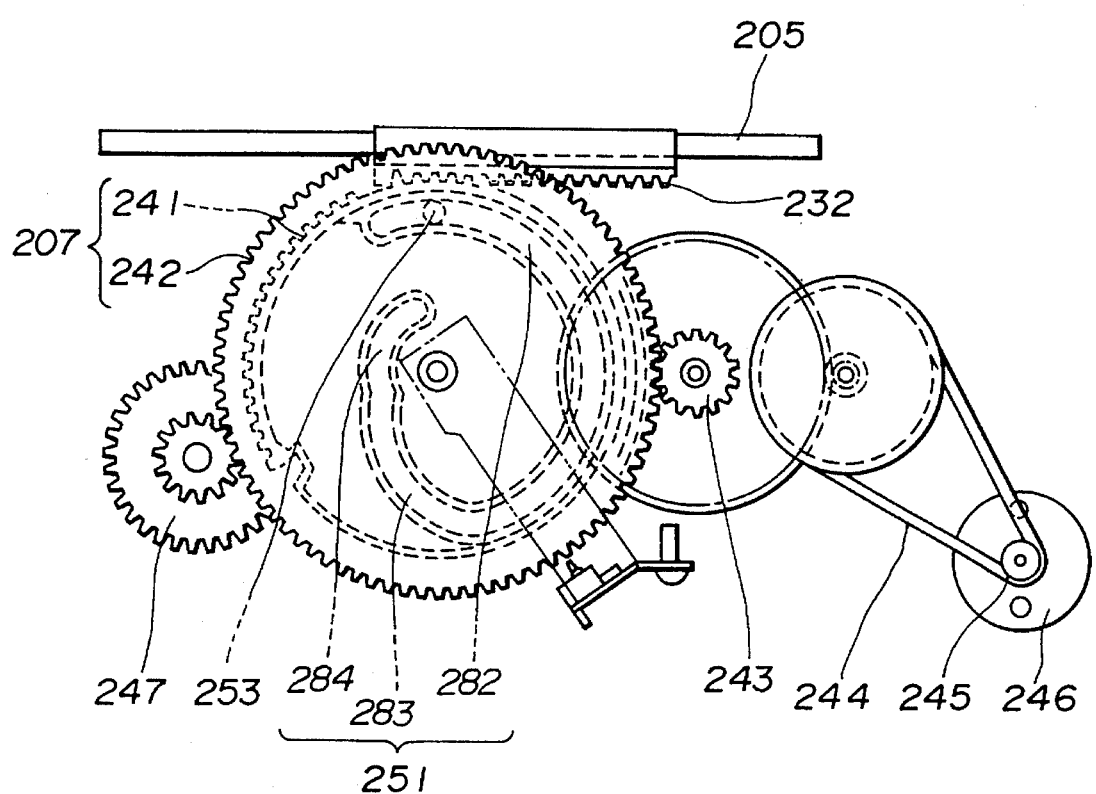
FIG. 22 is a side view showing a control gear member of the loading and chucking mechanism of FIG. 19.

The control gear member 207 has a small gear section 241, and a large gear section 242 whose diameter is larger than the diameter of the small gear section 241, as shown in FIG. 22. Gear teeth are formed in the entirety of the outer circumference of the large gear section 242. The small gear section 241 has gear teeth formed in about one fourth of the entire outer circumference of the small gear section 241.

The small gear section 241 is designed to mesh with the rack 232 of the operating plate 205. The large gear section 242 is in mesh with an intermediate gear 243, and connected through a timing belt 244 and a pulley 245 with a control gear driving motor 246. The control gear member 207 is thus rotated by the single motor 246.

Figure 23:
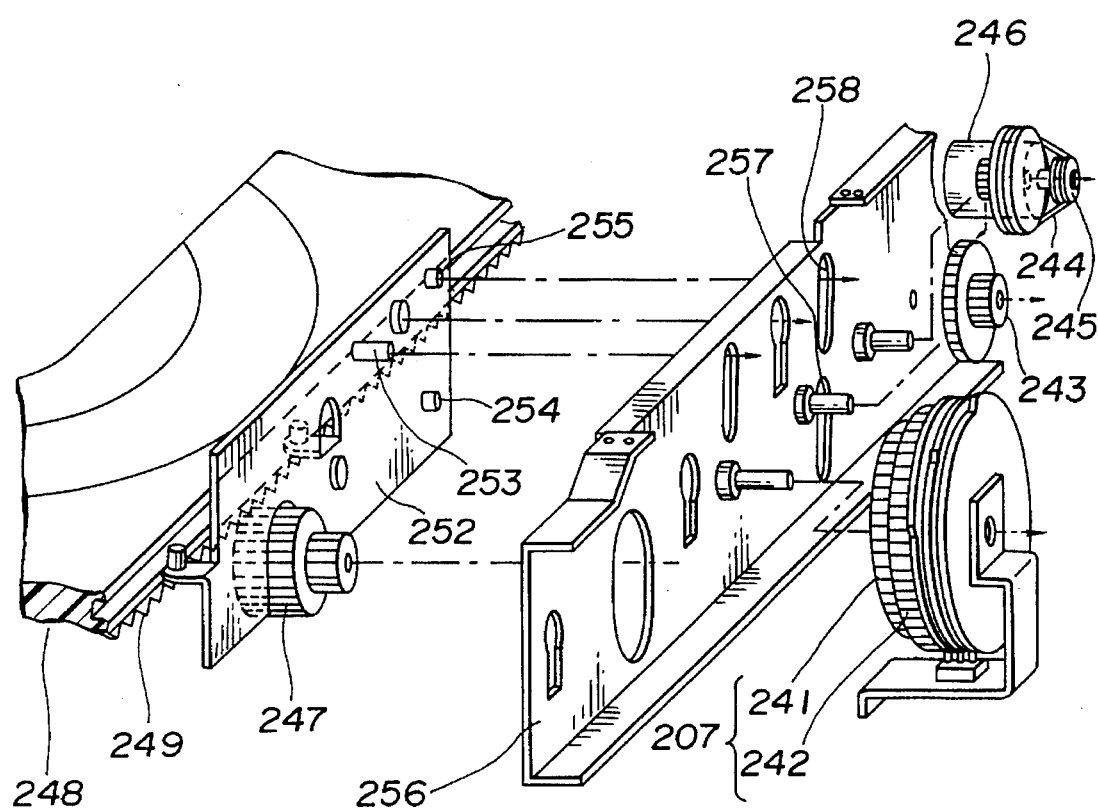
FIG. 23 is a perspective view showing a part of the loading and chucking mechanism of FIG. 19.

The control gear 207 is in mesh with an idler gear 247, which is, in turn, in mesh with a rack 249 formed in a disk tray 248, as shown in FIG. 23. In this example, the axis of the control gear member 207 is in parallel to the right and left lateral line.

When the motor 246 rotates the control gear member 207 in one direction, the gear connection of the large gear section 242, the idler gear 247 and the rack 249 causes the disk tray 248 to move horizontally from an eject state in which the disk tray 248 protrudes out of a casing which covers this mechanism 201, to a withdrawal state in which the disk tray 248 is withdrawn in the casing. Thereafter, the disk tray 248 is moved downwards toward the turntable by the action of a loading cam groove 251 formed in one side of the control gear 207. When the disk tray 248 starts moving downwards toward the turntable, the small gear section 241 of the control gear 207 engages with the rack 232 of the operating plate 205, and causes the chucking member 202 to move downwards by sliding the operating plate 205.

The disk tray 248 is supported on a vertically extending loading base plate 252 having a follower pin 253 shown in FIG. 23. The vertical loading base plate 252 has a right (first) side surface facing rightwards toward the control gear 207. The follower pin 253 projects toward the control gear 207 from the right side surface. The projecting end of the follower pin 253 is received in the loading cam groove 251 of the control gear member 207.

The vertical loading base plate 252 further has guide rollers (or guide pins) 254 and 255 projecting in the rightward direction from the right side surface of the loading base plate 252. These guide rollers 254 and 255 are received, respectively, in two vertical slots 257 and 258 formed in a vertical frame member 256. In this way, the loading base plate 252 is supported by the vertical frame member 256 in such a manner that the loading base plate 252 is movable up and down relative to the vertical frame member 256. The vertical frame member 256 is placed between the control gear member 207 and the loading base plate 252. In this example, the control gear member 207 is rotatably mounted on the vertical frame member 256.

The loading cam groove 251 of the control gear member 207 is designed to raise and lower the loading base plate 252 and the disk tray 248. The loading cam groove 251 is a single continuous spiral groove, and consists of an outer dwell groove section 282 for holding the loading base plate 252 at a higher position, an intermediate groove section 283 for raising and lowering the loading base plate 252, and an inner dwell groove section 284 for holding the loading base plate 252 at a lower position.

The outer dwell section 282 is shaped like an arc of a larger circle around the axis of the control gear member 207, and the inner dwell section 284 is like an arc of a small circle concentric with the larger circle. The intermediate section 283 extends continuously from one end of the outer dwell section 282 to one end of the inner dwell section 284, in such a spiral manner that the radial distance of the intermediate groove section 283 from the axis of the control gear member 207 is constantly reduced. The outer dwell section 282 starts from the vicinity of one end of the arched small gear section 241, and extends circumferentially through about 180° around the axis of the control gear 207 in the direction opposite to the small gear section 241. The intermediate groove section 283 extends through about 90°, and the inner dwell section 284 extends through about 90°. The angular length of the outer dwell section 282 is approximately equal to 180° while the angular length of each of the intermediate section 283 and the inner dwell section 284 is approximately equal to 90°.

In the state in which the follower pin 253 is in the outer dwell section 282 near the outer end of the groove 251, as shown in FIG. 22, the loading base plate 252 is raised, the disk tray 248 is ejected, and the small gear section 241 is out of engagement with the rack 232 of the operating plate 205. From this state, the loading operation is started by rotating the control gear member 207 in the counterclockwise direction. The idler gear 247 transmits this rotation of the control gear member 207, and causes the disk tray 248 to move to the withdrawal position.

After the withdrawal of the disk tray 248, the intermediate groove section 283 causes the disk tray 248 to move downwards. Before the end of this downward movement of the disk tray 248, the small gear section 241 of the control gear member 207 engages with the rack 232 of the operating plate 205 and causes the operating plate 205 to slide. In this sliding movement of the operating plate 205, the second groove section 204b of the chucking cam groove 204 formed in the operating plate 205 causes the chucking member 202 to move downwards. The chucking operation of the lower (A) side 206b of the disk 206 is finished approximately at the same time with the end of the downward movement of the disk tray 248.

Figures 24, 24A, 24B, 24C, 24D, 24E, 24F, 24G, 24H:
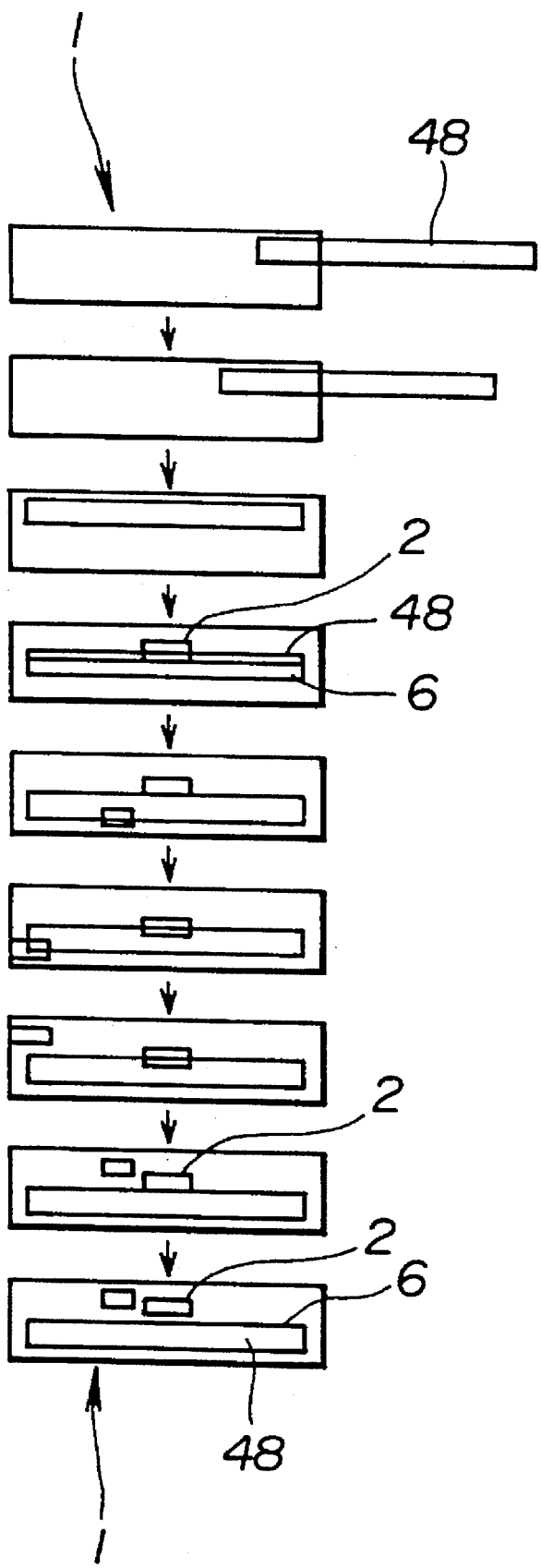

The chucking operation of the upper (B) side 206a of the disk 206 is performed by further rotating the control gear member 207 in the counterclockwise direction. With this further counterclockwise rotation of the control gear member 207, the chucking member 202 moves further downwards by the action of the fourth groove section 204d of the chucking cam groove 204, and the centering member provided in the underside of the chucking member 202 performs the centering of the upper (B) side 206a of the disk 206. Thereafter, the chucking member 202 is moved slightly upwards by the action of the fifth groove section 204f, and the chucking of the upper (B) side 206a is completed. FIG. 24 shows various states from the eject state to the end of the upper (B) side chucking. Specifically, FIG. 24A shows the EJECT state; FIG. 24B shows the LOADING, UNLOADING START state; FIG. 24C shows the WITHDRAWAL END, DISK TRAY DOWN START state; FIG. 24D shows the A SIDE CHUCKING START state; FIG. 24E shows the DISK TRAY DOWN END, A SIDE CHUCKING END state; FIG. 24F shows the B SIDE CENTERING START state; FIG. 24G shows the B SIDE CENTERING END state; FIG 24H shows the CHUCKING MEMBER UP state; and FIG. 24I shows the B SIDE CHUCKING END state.

These states are detected by the before-mentioned disk cam 208 of the control gear member 207, and the three switches 209, 210 and 211. The switches 209, 210 and 211 are installed under the disk cam 208. The disk cam 208 is fixed to the right side of the large diameter section 242 of the control gear member 207, and contoured to turn the switches 209, 210 and 211 on and off by directly touching and pushing. In this example, the disk cam 208 consists of first, second and third circular cam plates 261, 262 and 263 shown in FIGS. 25A to 25C. The second cam plate 262 is sandwiched between the first and third cam plates 261 and 263. The three cam plates 261, 262 and 263 are joined together, and fixed to the gear sections of the control gear member 207. The gear sections 241 and 242 and the cam plates 261, 262 and 263 all rotate as a unit about the axis of the control gear member 207.

Figure 25A:
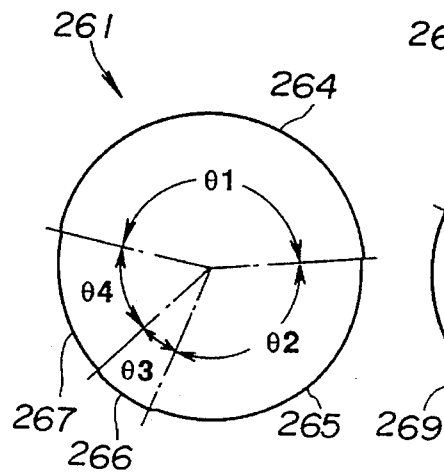
FIGS. 25A to 25C show an exploded view of a disk cam of the control gear member shown in FIG. 19.
Figure 25B:
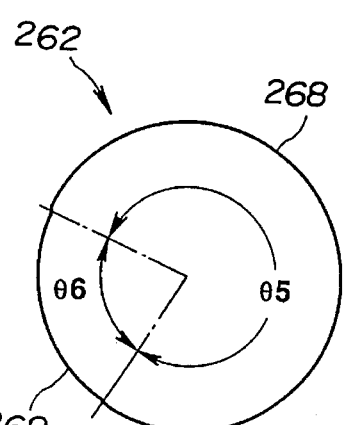
Figure 25C:
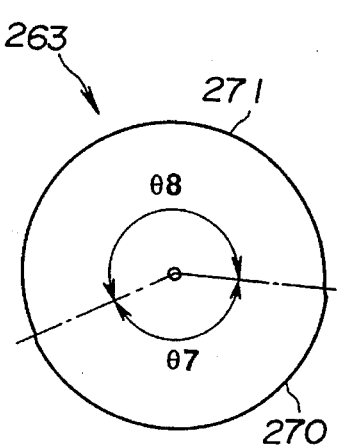

The first circular cam plate 261 has a contoured outer circumference consisting of first, second, third and fourth arcs 264, 265, 266 and 267, as shown in FIGS. 25A to 25C. The first and third arcs 264 and 266 are shaped like arcs of a larger circle, and adapted to push the first switch 209 to turn it on. The second and fourth arcs 265 and 267 are shaped like arcs of a smaller circle concentric with the larger circle, and adapted to release the first switch 209 to turn it off. The smaller-radius releasing second arc 265 is located circumferentially between the larger-radius pushing first and third arcs 264 and 266. The smaller-radius releasing fourth arc 267 is between the larger-radius third and first arcs 266 and 264. In this example, the angle 81 subtended at the center by the first arc 264 is greater than 90° but smaller than 180°. The first arc 264 bounds a sector with two radii, and the angle θ1 is formed between these two radii. The angle θ2 subtended by the second arc 265 is greater than 90°, and smaller than the angle θ1. The angle 83 subtended at the center by the third arc 266 is the smallest. The angle θ4 subtended at the center by the fourth arc 267 is smaller than the second angle 82, and smaller than 90°. The sum of these angles is equal to 360°(θ1+θ2+θ3+θ4=360°).

The contoured outer circumference of the second circular cam plate 262 consists of first (larger-radius) arc 268 and second (smaller-radius) arc 269. The first and second arcs 268 and 269 are, respectively, in the form of arcs of larger and smaller concentric circles. The angle 85 subtended at the center by the first arc 268 is greater than the angle 86 of the second arc 269. In this example, the angle 86 is nearly 90°. The sum of the angles θ5 and θ6 is 360°(θ5+θ6=360°). The first arc 268 is designed to turn on the second switch 210 by pushing the second switch 209, and the second arc 269 can release the second switch 209 to bring it to the off state.

The third circular cam plate 263 has a first arc 270 for pushing the third switch 211 to turn it on, and a second arc 271 for releasing the third switch 211. In this example, the angle θ7 subtended by the first arc 270 is greater than 90°, but smaller than 180°. The sum of the angle θ7 of the first arc 270 and the angle θ8 of the second arc 271 is equal to 360°(θ7+θ8=360°).

Figure 26:
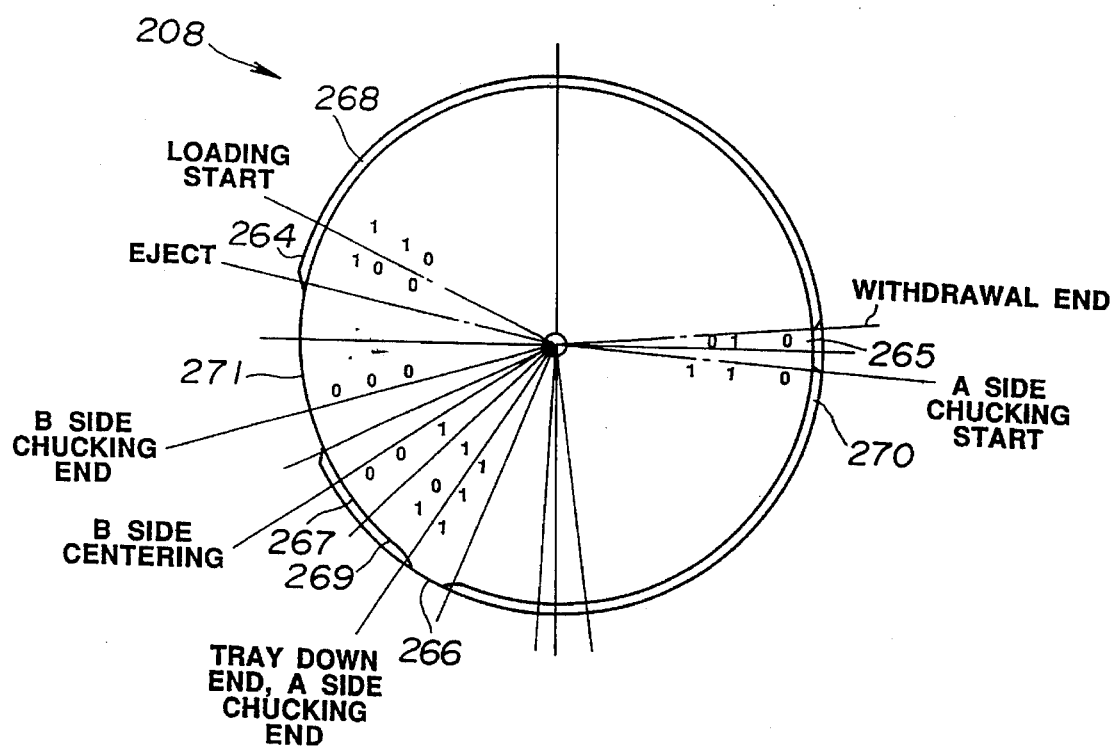
FIG. 26 is a side view of the disk cam of FIG. 25.
Figure 27:
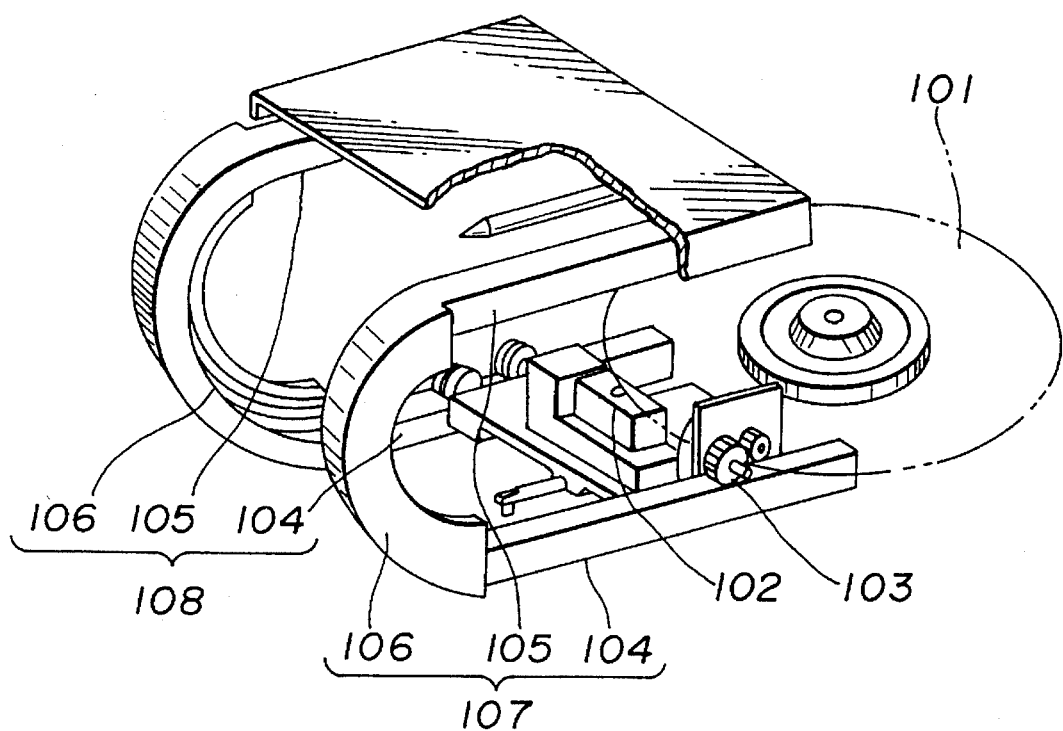
FIG. 27 is perspective view showing one conventional form of a pickup guide mechanism.

When the disk tray 248 is in the eject state, the first pushing arc 264 of the first cam plate 261 turns on the first switch 209, as shown in FIG. 26.

When the loading start state is reached from the eject state, the pushing arc 268 of the second plate 62 turns on the second switch 210.

When the disk tray is fully withdrawn to its closed state, the releasing arc 265 of the first plate 261 turns off the first switch 209 to signal that the downward movement start state is reached.

When the A side chucking state is reached, the pushing arc 270 of the third plate 263 turns on the third switch 211.

When the downward movement of the disk tray 248 comes to an end, and the A side chucking is finished, the pushing arc 266 turns on the first switch 209 again.

When the chucking member 2 further moves down, and the B side centering is started, the releasing arc 269 turns off the second switch 210.

When the B side centering is finished, the releasing arc 267 turns off the first switch 209.

When the chucking member 202 moves up from the B side centering end position, and the B side chucking is finished, the releasing arc 271 turns off the third switch 211.

In the thus-constructed disk player, the single motor 246 rotates the control gear member 207 which is used in common for the loading and chucking operations. Therefore, the loading, A side chucking and B side chucking operations are performed successively as the control gear member 207 rotates. The chucking cam mechanism can accurately control both the A side chucking and the B side chucking with a simple and reliable construction. The position detecting switches 209, 210 and 211 can accurately detect each state of the process by sensing the angular position of the single control gear member 207. The three switches 209, 210 and 211 are compactly arranged at the same position underneath the control gear member 207, and they are operated directly by the disk cam without requiring levers and some other linkages. There is no need for detecting the positions of separate members.

The present invention may be embodied in other specific forms without departing from the spirit or essential characteristics thereof. The present embodiment is therefore to be considered as illustrative and not restrictive, the scope of the invention being indicated by the appended claims rather than by the forgoing description. All changes which come within the meaning and range of equivalency of the claims are therefore intended to be embraced therein.

What is claimed is:

1. A disk player comprising:

a pickup carrier comprising an optical pickup for reading information recorded in a disk;

a support member comprising a flat reference surface; and a guide member which is supported by said support member and which supports said pickup carrier and guides said pickup carrier along a predetermined path in a plane parallel to said reference surface of said support member, said guide member comprising a lower guide section for assisting said pickup carrier to move under said disk, an upper guide section for assisting said pickup carrier to move over said disk, and an arched intermediate guide section connecting outer ends of said lower and upper guide sections and assisting said pickup carrier to move from said lower guide section to said upper guide section and vice versa, said lower and upper guide sections being oblique with respect to each other so that said lower and upper guide sections become gradually wider apart from each other toward said arched guide section;

wherein said pickup carrier comprises a rear end confronting said flat reference surface of said support member and a front end which is more remote from said flat reference surface than said rear end of said pickup carrier, and said pickup carrier is supported only at said rear end of said pickup carrier by said guide member, said pickup carrier projecting from said rear end away from said flat reference surface, and hanging free at said front end of said pickup carrier;

wherein said disk player further comprises a tilting means for joining said guide member to said flat reference surface of said support member, and for swinging said guide member about an imaginary pivot axis which is substantially perpendicular to said flat reference surface, so that said outer ends of said lower and upper guide sections move up and down.

2. A disk player according to claim 1 wherein said tilting means comprises a spring for pulling said guide member toward said flat reference surface of said support member, and further pulling said pickup carrier toward said flat reference surface through said guide member.

3. A disk player according to claim 1 wherein said tilting means further comprises at least one pin joint comprising a slider pin which is fixed to one of said support member and said guide member, and an elongate slot which is formed in the other of said support member and said guide member, and which is elongated in such a manner as to allow said guide member to swing about said pivot axis by allowing said slider pin to move in said slot.

4. A disk player according to claim 3 wherein said guide member comprises a guide groove and a portion defining a rack, and said pickup carrier comprises a pinion meshing with said rack of said guide member, and a roller set comprising a middle guide roller, and two outer guide rollers situated on both sides of said middle guide roller, axes of said outer guide rollers being parallel to each other, and an axis of said middle guide roller being parallel to, and spaced from, a plane containing the axes of said outer guide rollers, said guide rollers being received in said guide groove so that said outer guide rollers roll on one of two opposite side walls of said guide groove, and said middle guide roller rolls on the other of said opposite, side walls of said guide groove.

5. A disk player according to claim 4 wherein said pickup carrier further comprises a roller supporting means for supporting said guide rollers so that an offset distance between the axis of said middle guide roller and the plan containing the axes of said outer guide rollers is variable, and said roller supporting means comprises a spring for tending to cause the offset distance to increase.

6. A disk player according to claim 4 wherein said pickup carrier comprises a flat rear end surface, and parallel rollers for rolling on said flat reference surface of said support member and holding said rear end surface of said pickup carrier in parallel to said flat reference surface.

7. A disk player according to claim 6 wherein the axes of said guide rollers are substantially perpendicular to said flat reference surface of said support member, and axes of said parallel rollers are substantially parallel to said flat reference surface.

8. A disk player according to claim 6 wherein said tilting means comprises a tilt cam mechanism comprising a rotary cam mounted on said support member, and a tilt cam follower for moving the outer ends of said lower and upper guide sections of said guide member up and down.

9. A disk player according to claim 8 wherein said rotary cam comprises a side surface formed with a spiral cam groove, and a contoured outer periphery, and said tilt cam follower comprises a pin fixed to said arched guide section of said guide member, and wherein said disk player further comprises a tilt position detecting switch which is operated by said contoured outer periphery of said rotary cam.

10. A disk player comprising:

a pickup carrier comprising an optical pickup for reading information recorded in a disk; a support member comprising a flat reference surface;

a guide member which is supported by said support member and which supports said pickup carrier and guides said pickup carrier along a predetermined path in a plane parallel to said reference surface of said support member, said guide member comprising a lower guide section for assisting said pickup carrier to move under said disk, an upper guide section for assisting said pickup carrier to move over said disk, and an arched intermediate guide section connecting outer ends of said lower and upper guide sections and assisting said pickup carrier to move from said lower guide section to said upper guide section and vice versa, said lower and upper guide sections being oblique with respect to each other so that said lower and upper guide sections become gradually wider apart from each other toward said arched guide section;

wherein said disk player further comprises a control gear member, a loading mechanism for loading and unloading the disk by receiving motion from said control gear member, and a chucking mechanism comprising a disk chucking member for chucking the disk, and a chuck linkage for transmitting motion from said control gear member to said chucking member;

wherein said chuck linkage comprises a translational cam mechanism for producing a prescribed chucking movement of said chucking member; and wherein said control gear member comprises a first gear section; and said translational cam mechanism of said chuck linkage comprises a translational cam plate which comprises a portion defining a rack meshing with said first gear section of said control gear to cause said translational cam plate to move translationally in a first slide direction, and a portion defining a chucking cam groove; and a slider plate comprising a follower projection which is received in said chucking cam groove and which causes said slider plate to move along a second slide direction; said chuck linkage further comprising a lifting linkage, connected with said slider plate, for moving said chucking member up and down.

11. A disk player according to claim 10 wherein said disk player further comprises a stationary frame comprising a slot extending along said second slide direction, and said lifting linkage comprises a first bar having a lower end supporting said chucking member, and an upper end which is pivotally connected with said slider plate by a pin slidably received in said slot of said stationary frame, and a second bar having an upper end pivotally connected with said frame, and a lower end pivotally connected with a middle of said first bar.

12. A disk player according to claim 11 wherein said chucking cam groove comprises a first groove section for holding said chucking member at an unchucking position, a second groove section for lowering said chucking member from the unchucking position to a first chucking position, a third groove section for holding said chucking member at the first chucking position, a fourth groove section for lowering said chucking member from the first chucking position to a first centering position, a fifth groove section for holding said chucking member at the first centering position, a sixth groove section for raising said chucking member from the first centering position to a second chucking position, and a seventh groove section for holding said chucking member at the second chucking position, each of said first, third, fifth and seventh groove sections extending along said first slide direction.

13. A disk player according to claim 10 wherein said control gear member further comprises a second gear section which is in engagement with a gear for moving a disk tray horizontally, and a side surface formed with a loading spiral groove for moving said disk tray up and down.

14. A disk player according to claim 13 wherein said disk player further comprises a plurality of loading and chucking detecting switches for detecting a position of said chucking member and a position of said disk tray, and said control gear member comprises a disk cam for operating said loading and chucking detecting switches.

* * * * *